(12) United States Patent
Awamori et al.

(10) Patent No.: US 10,800,406 B2
(45) Date of Patent: Oct. 13, 2020

(54) MINING MACHINE, MANAGEMENT SYSTEM OF MINING MACHINE, AND MANAGEMENT METHOD OF MINING MACHINE

(71) Applicant: Komatsu Ltd., Tokyo (JP)

(72) Inventors: Katsuki Awamori, Hiratsuka (JP); Tomikazu Tanuki, Fujisawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/760,557

(22) PCT Filed: Dec. 26, 2014

(86) PCT No.: PCT/JP2014/084621
§ 371 (c)(1),
(2) Date: Jul. 13, 2015

(87) PCT Pub. No.: WO2015/102096
PCT Pub. Date: Jul. 9, 2015

(65) Prior Publication Data
US 2016/0185346 A1 Jun. 30, 2016

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01); *G05D 1/0231* (2013.01);
(Continued)

(58) Field of Classification Search
CPC combination set(s) only.
See application file for complete search history.

(56) References Cited

U.S. PATENT DOCUMENTS

| 6,142,252 A | 11/2000 | Kinto et al. |
| 2002/0099481 A1 | 7/2002 | Mori |

(Continued)

FOREIGN PATENT DOCUMENTS

| CN | 103217978 A | 7/2013 |
| CN | 103988239 A | 8/2014 |

(Continued)

OTHER PUBLICATIONS

International Search Report dated Mar. 31, 2015, issued for PCT/JP2014/084621.

(Continued)

*Primary Examiner* — Khoi H Tran
*Assistant Examiner* — Rodney P King
(74) *Attorney, Agent, or Firm* — Locke Lord LLP

(57) ABSTRACT

A mining machine includes a traveling device traveling a traveling path in a mine, a vehicle body supported by the traveling device, a non-contact sensor in a front section of the vehicle body which contactlessly detects an object in a detection area, and is arranged such that the traveling path in front of the vehicle body and an area beside the traveling path are included in the detection area, an obstacle detector detecting an obstacle in the traveling path in front of the vehicle body based on an output signal of the non-contact sensor, a distance detector a distance to a wall beside the traveling path based on an output signal of the non-contact sensor, and a traveling controller controlling the traveling device based on a detection result of at least one of the obstacle detection unit and the distance detection unit.

14 Claims, 15 Drawing Sheets

(51) Int. Cl.
  *B60W 10/20*  (2006.01)
  *G05D 1/02*  (2020.01)
(52) U.S. Cl.
  CPC ..... *B60W 2554/00* (2020.02); *B60W 2710/18* (2013.01); *B60W 2710/20* (2013.01); *G05D 2201/021* (2013.01)

(56) References Cited

U.S. PATENT DOCUMENTS

| | | | | |
|---|---|---|---|---|
| 2002/0107637 | A1* | 8/2002 | Okamura | G01S 7/412 701/301 |
| 2008/0258897 | A1* | 10/2008 | Itoh | B60K 35/00 340/461 |
| 2009/0043439 | A1* | 2/2009 | Barfoot | G08G 1/20 701/25 |
| 2012/0095639 | A1* | 4/2012 | Makela et al. | E21F 13/025 701/25 |
| 2013/0238182 | A1* | 9/2013 | Osagawa | G05D 1/0274 701/26 |
| 2014/0358382 | A1 | 12/2014 | Kou et al. | |

FOREIGN PATENT DOCUMENTS

| | | |
|---|---|---|
| EP | 2631729 A1 | 8/2013 |
| JP | 63-314621 A | 12/1988 |
| JP | 01-293409 A | 11/1989 |
| JP | 05-061540 A | 3/1993 |
| JP | 06-242824 A | 9/1994 |
| JP | 06-343334 A | 12/1994 |
| JP | 10-027020 A | 1/1998 |
| JP | 2001-089096 A | 4/2001 |
| JP | 2002-215236 A | 7/2002 |
| JP | 2011-059905 A | 3/2011 |
| JP | 2011-248713 A | 12/2011 |
| WO | WO-2013/133004 A1 | 9/2013 |

OTHER PUBLICATIONS

Office Action dated May 10, 2016, issued for the corresponding Canadian patent application No. 2,898,288.

* cited by examiner

MINING MACHINE, MANAGEMENT SYSTEM OF MINING MACHINE, AND MANAGEMENT METHOD OF MINING MACHINE

FIELD

The present invention relates to a mining machine, a management system of a mining machine, and a management method of a mining machine.

BACKGROUND

When a mining machine travels a traveling path of a mine, a distance between a bank-like wall beside the traveling path and the mining machine may be detected. Patent Literature 1 discloses an example of a technique to detect a distance between an unmanned vehicle and a roadside strip and to control traveling of the unmanned vehicle.

CITATION LIST

Patent Literature

Patent Literature 1: Japanese Patent Application Laid-open No. 2002-215236

SUMMARY

Technical Problem

When foreign objects such as dust or dirt are attached to a sensor that detects the distance between the wall and the mining machine or the sensor comes into contact with the wall, the detection accuracy of the sensor may degrade.

An object of an aspect of the present invention is to provide a mining machine, a management system of mining machine, and a management method of mining machine, which can suppress degradation of the detection accuracy of the distance between the mining machine and the wall.

Solution to Problem

According to a first embodiment of the invention, there is provided a mining machine comprising: a traveling device that can travel a traveling path in a mine; a vehicle body that is supported by the traveling device; a non-contact sensor which is provided in a front section of the vehicle body and is able to contactlessly detect an object in a detection area, the non-contact sensor being arranged such that the traveling path in front of the vehicle body and an area beside the traveling path when the traveling device travels are included in the detection area; an obstacle detection unit that detects an obstacle in the traveling path in front of the vehicle body based on an output signal of the non-contact sensor; a distance detection unit that detects a distance to a wall beside the traveling path based on an output signal of the non-contact sensor; and a traveling control unit that controls the traveling device based on a detection result of at least one of the obstacle detection unit and the distance detection unit.

According to a second embodiment of the invention, there is provided a management system of a mining machine including a traveling device that can travel a traveling path in a mine and a vehicle body that is supported by the traveling device, the management system of the mining machine comprising: a non-contact sensor which is provided in a front section of the vehicle body and is able to contactlessly detect an object in a detection area, the non-contact sensor being arranged such that the traveling path in front of the vehicle body and an area beside the traveling path when the traveling device travels are included in the detection area; an obstacle detection unit that detects an obstacle in the traveling path in front of the vehicle body based on an output signal of the non-contact sensor; a distance detection unit that detects a distance between a wall beside the traveling path and the vehicle body based on an output signal of the non-contact sensor; and a traveling control unit that controls the traveling device based on a detection result of at least one of the obstacle detection unit and the distance detection unit.

According to a third embodiment of the invention, there is provided a management method of a mining machine including a traveling device that can travel a traveling path in a mine and a vehicle body that is supported by the traveling device, the management method of the mining machine comprising: causing the vehicle body to travel by the traveling device while arranging a non-contact sensor which is provided in a front section of the vehicle body and is able to contactlessly detect an object such that the traveling path in front of the vehicle body and an area beside the traveling path are included in a detection area of the non-contact sensor; detecting an obstacle in the traveling path in front of the vehicle body based on an output signal of the non-contact sensor; detecting a distance between a wall beside the traveling path and the vehicle body based on an output signal of the non-contact sensor; and controlling the traveling device based on at least one of a detection result of the obstacle and a detection result of the distance.

Advantageous Effects of Invention

According to the aspects of the present invention, a mining machine, a management system of mining machine, and a management method of mining machine, which can suppress degradation of the detection accuracy of the distance between the mining machine and the wall, are provided.

DESCRIPTION OF EMBODIMENTS

Hereinafter, embodiments of the present invention will be described with reference to the drawings. However, the present invention is not limited to the embodiments. It is possible to properly combine components of the embodiments described below. Alternatively, some components may not be used.

<Overview of Management System of Mining Machine>

Figure 1:
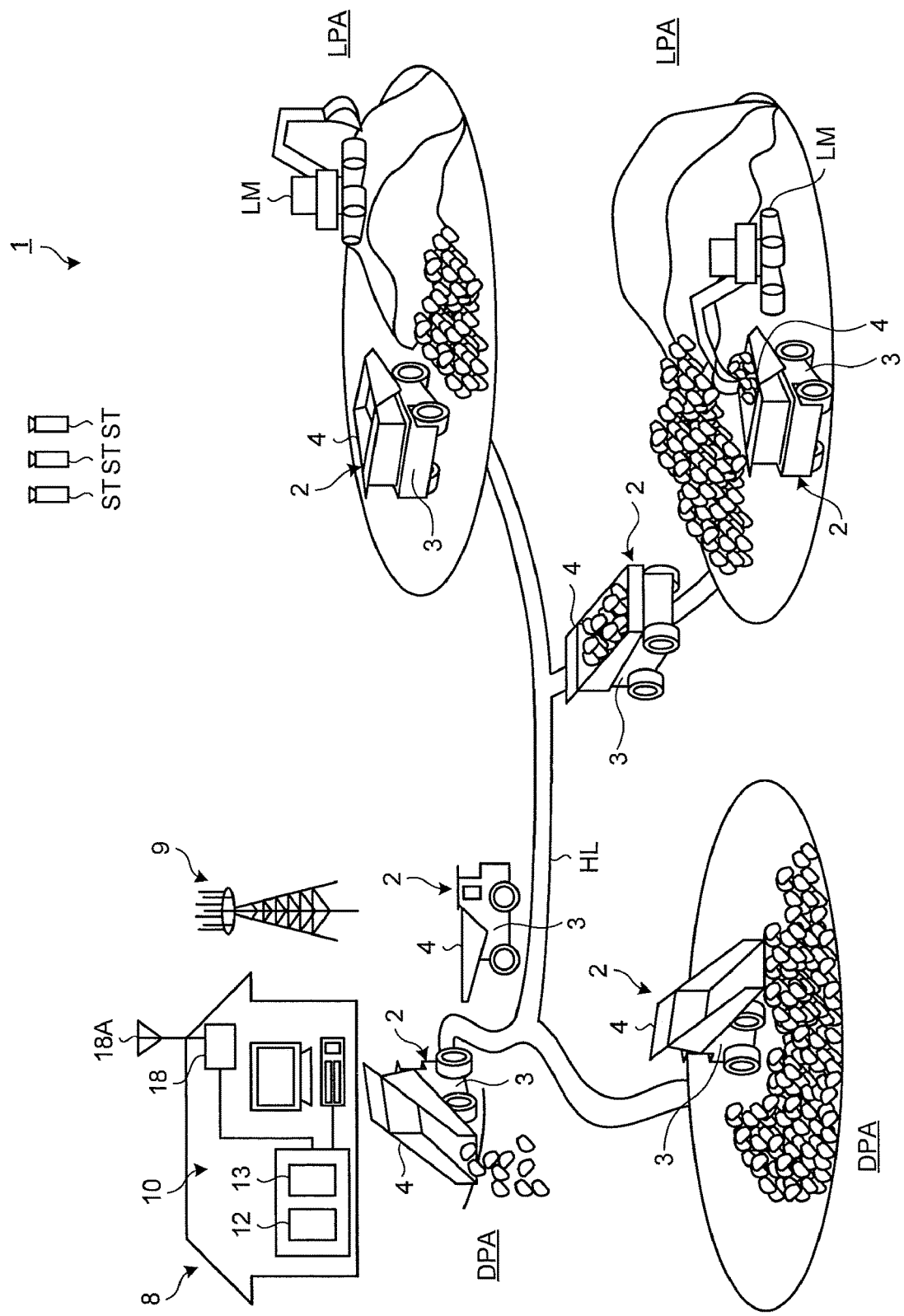
FIG. 1 is a diagram illustrating an example of a management system of mining machine according to an embodiment.

FIG. 1 is a diagram illustrating an example of a management system 1 of a mining machine 2 according to the embodiment. FIG. 1 schematically illustrates the management system 1 and a digging site of a mine to which the management system 1 is applied.

The management system 1 manages the mining machine 2. The management of the mining machine 2 includes at least one of operation management of the mining machine 2, evaluation of productivity of the mining machine 2, evaluation of operation technique of an operator of the mining machine 2, maintenance of the mining machine 2, and abnormality diagnosis of the mining machine 2.

The mining machine 2 is used for work in a mine. The mining machine 2 includes at least one of a transport vehicle, an excavating machine, and a loading machine. In the embodiment, an example will be described in which the mining machine 2 is a dump truck 2 that can travel a mine. The dump truck 2 is a kind of transport vehicle. The dump truck 2 transports a load in a mine. The dump truck 2 includes a vehicle 3 and a vessel 4 provided to the vehicle 3. The dump truck 2 transports a load loaded on the vessel 4. The load includes earth and sand or stones and rocks, which are generated by mining of crushed stone.

In a digging site of a mine, a loading site LPA, an earth discharging site DPA, and a traveling path HL leading to at least one of the loading site LPA and the earth discharging site DPA are provided. The dump truck 2 can travel the loading site LPA, the earth discharging site DPA, and the traveling path HL. The dump truck 2 can move between the loading site LPA and the earth discharging site DPA by traveling through the traveling path HL. The traveling path HL of a mine is often unpaved.

A load is loaded on the vessel 4 at the loading site LPA. The load is loaded on the vessel 4 by a loading machine LM. A hydraulic shovel or a wheel loader is used as the loading machine LM. The dump truck 2 on which the load is loaded travels the traveling path HL from the loading site LPA to the earth discharging site DPA. The load is discharged from the vessel 4 at the earth discharging site DPA. The dump truck 2 from which the load is discharged travels the traveling path HL from the earth discharging site DPA to the loading site LPA. The dump truck 2 may travel from the earth discharging site DPA to a predetermined waiting site.

As illustrated in FIG. 1, the management system 1 includes a management device 10 which is arranged in a control facility 8 of the mine and manages the dump truck 2 and a communication system 9 that can transmit data.

The management device 10 includes a computer system. The communication system 9 transmits data including an instruction signal between the management device 10 and the dump truck 2. The management device 10 and the dump truck 2 can communicate with each other through the communication system 9. The communication system 9 includes a wireless communication system. The management device 10 and the dump truck 2 can wirelessly communicate with each other through the communication system 9.

In the embodiment, the dump truck 2 is a so-called unmanned dump truck which is operated by the instruction signal from the management device 10. A driver does not ride in the dump truck 2 during a normal transport operation. A driver may ride in the dump truck 2 when the dump truck 2 is brought into or brought out from a parking lot or when the dump truck 2 stops in emergency.

The position of the dump truck 2 is detected by a global positioning system (GPS). The GPS has a GPS satellite ST. The position detected by the GPS is an absolute position. In the description below, the position detected by the GPS is referred to as a GPS position as needed. The GPS position includes coordinate data of latitude, longitude, and altitude.

<Management Device>

Figure 2:
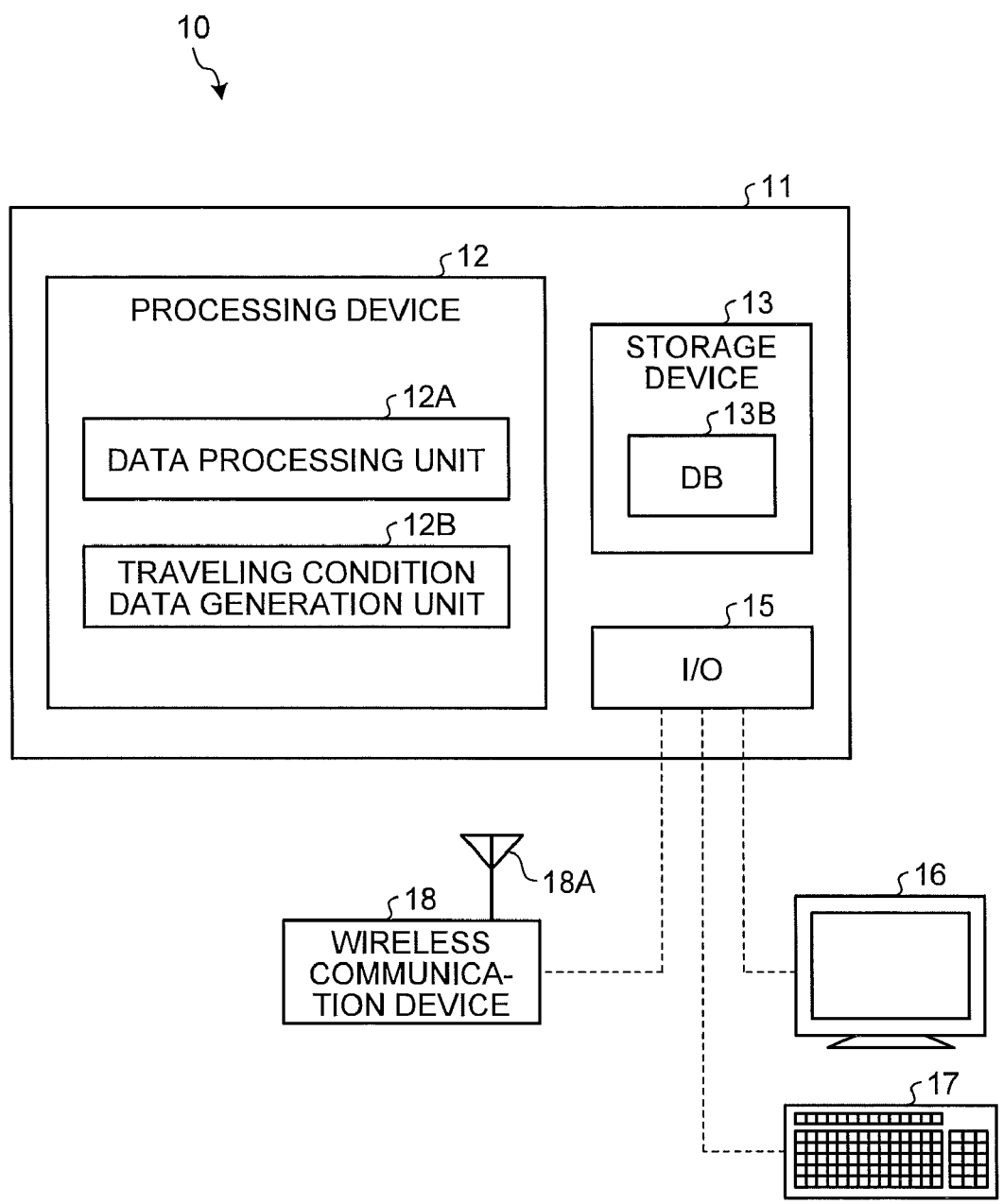
FIG. 2 is a diagram illustrating an example of a management device according to the embodiment.

Next, the management device 10 will be described. FIG. 2 is a block diagram illustrating an example of the management device 10 according to the embodiment. As illustrated in FIGS. 1 and 2, the management device 10 includes a computer system 11, a display device 16, an input device 17, and a wireless communication device 18.

The computer system 11 includes a processing device 12, a storage device 13, and an input/output unit 15. The display device 16, the input device 17, and the wireless communication device 18 are connected to the computer system 11 through the input/output unit 15.

The processing device 12 includes a processor such as a CPU (Central Processing Unit). The processing device 12 performs various processing related to the management of the dump truck 2. The processing device 12 includes a data processing unit 12A and a traveling condition data generation unit 12B. For example, the data processing unit 12A processes position data indicating the position of the dump truck 2. The traveling condition data generation unit 12B generates traveling condition data indicating a traveling condition of the dump truck 2. The traveling condition of the dump truck 2 includes a traveling speed of the dump truck 2 and a traveling route. The dump truck 2 travels according to the traveling condition generated by the traveling condition data generation unit 12B on at least a part of the loading site LPA, the earth discharging site DPA, and the traveling path HL.

The storage device 13 is connected to the processing device 12. The storage device 13 includes a memory such as a RAM (Random Access Memory), a ROM (Read Only Memory), a flash memory, and a hard disk drive. The storage device 13 stores various data related to the management of the dump truck 2. The storage device 13 includes a database 13B in which data is registered. The storage device 13 stores a computer program for causing the processing device 12 to perform various processing. The traveling condition data generation unit 12B generates the traveling condition data by using the computer program stored in the storage device 13.

The display device 16 includes a flat panel display such as a liquid crystal display. The display device 16 can display, for example, position data indicating a position of the dump truck 2.

The input device 17 includes input devices such as a keyboard, a touch panel, and a mouse. The input device 17 functions as an operation unit that can input an operation signal to the processing device 12. A controller of the control facility 8 can input an operation signal to the processing device 12 by operating the input device 17.

The communication system 9 includes the wireless communication device 18. The wireless communication device 18 is arranged in the control facility 8. The wireless communication device 18 is connected to the processing device 12 through the input/output unit 15. The wireless communication device 18 includes an antenna 18A. The wireless communication device 18 can receive data transmitted from the dump truck 2. The data received by the wireless communication device 18 is outputted to the processing device 12. The data received by the wireless communication device 18 is stored in the storage device 13. The wireless communication device 18 can transmit data including an instruction signal to the dump truck 2.

<Dump Truck>

Figure 3:
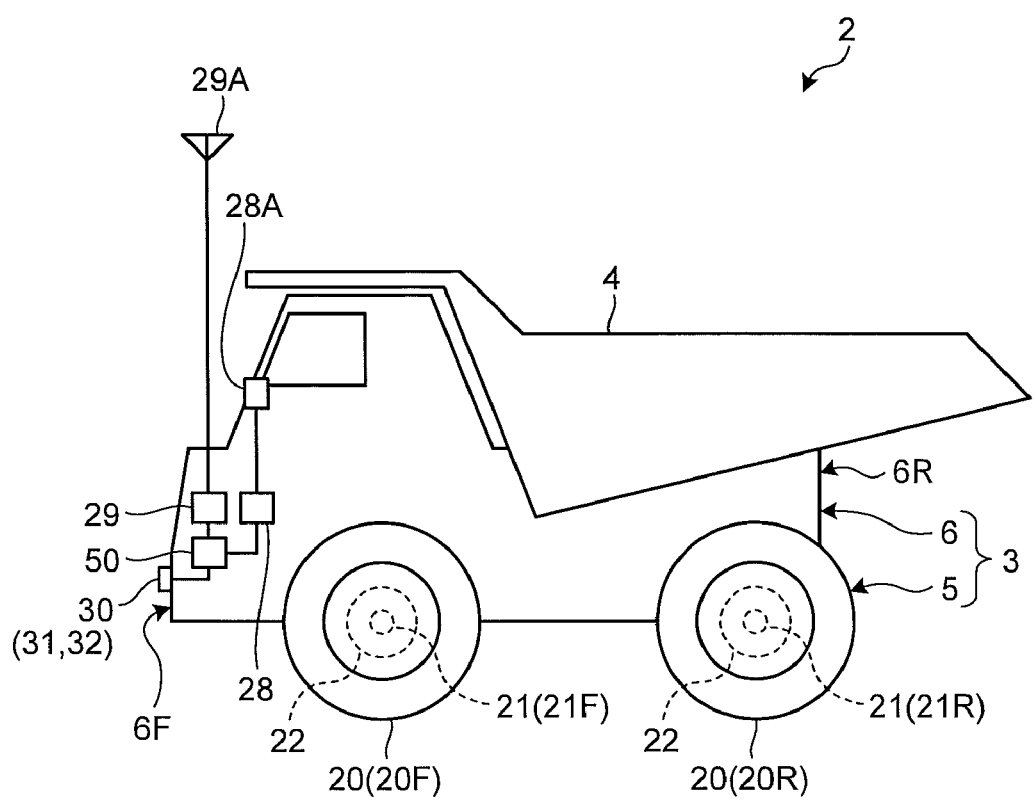
FIG. 3 is a diagram illustrating an example of a dump truck according to the embodiment.
Figure 4:
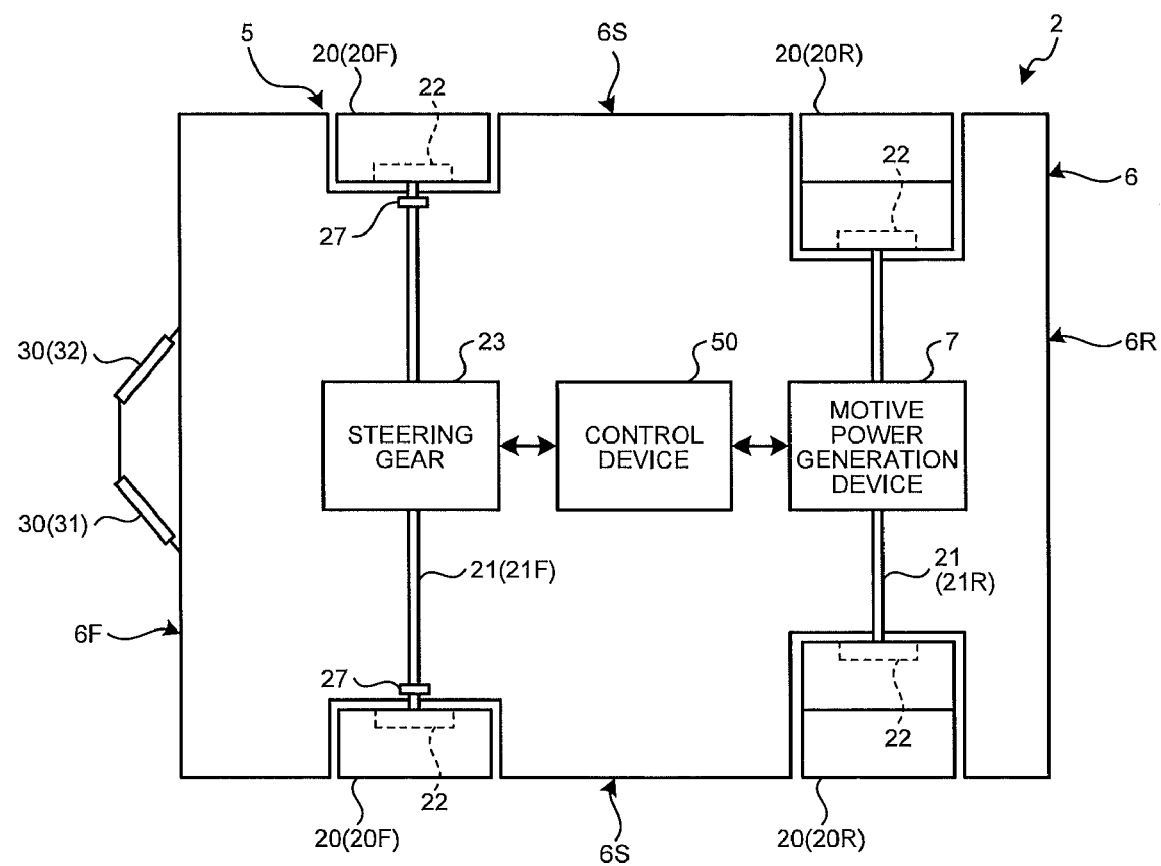
FIG. 4 is a diagram illustrating an example of the dump truck according to the embodiment.

Next, the dump truck 2 will be described. FIGS. 3 and 4 are diagrams schematically illustrating an example of the dump truck 2 according to the embodiment.

The dump truck 2 includes the vehicle 3, the vessel 4 mounted on the vehicle 3, a non-contact sensor 30 that contactlessly detects an object, a speed sensor 27 that detects a traveling speed of the dump truck 2, a position sensor 28 that detects a position of the dump truck 2, and a wireless communication device 29.

The vehicle 3 includes a traveling device 5 that can travel the traveling path HL of the mine, a vehicle body 6 that is supported by the traveling device 5, and a motive power generation device 7 that generates motive power. At least a part of the vehicle body 6 is arranged above the traveling device 5. The vessel 4 is supported by the vehicle body 6. The vehicle body 6 includes a front section 6F, a rear section 6R, and side sections 6S.

The vessel 4 is a member on which a load is loaded. The vessel 4 can tilt with respect to the vehicle 3 by a tilting device. The tilting device includes an actuator such as a hydraulic cylinder (hoist cylinder) arranged between the vessel 4 and the vehicle body 6. When the vessel 4 is tilted by the tilting device, the load on the vessel 4 is discharged.

The traveling device 5 includes vehicle wheels 20, axles 21 that rotatably support the vehicle wheels 20, a brake device 22 that can stop traveling, and a steering gear 23 that can adjust a traveling direction.

The vehicle wheel 20 includes a wheel supported by the axle 21 and a tire supported by the wheel. The vehicle wheels 20 include front wheels 20F and rear wheels 20R. In the embodiment, the front wheels 20F include two tires, one of which is provided at the left of the vehicle body 6, and the other one of which is provided at the right of the vehicle body 6. The rear wheels 20R include four tires, two of which are provided at the left of the vehicle body 6, and the other two of which are provided at the right of the vehicle body 6. The axles 21 include an axle 21F that rotatably supports the front wheels 20F and an axle 21R that rotatably supports the rear wheels 20R.

The traveling device 5 is driven by motive power generated by the motive power generation device 7. The motive power generation device 7 drives the traveling device 5 by an electric drive method. The motive power generation device 7 includes an internal combustion engine such as a diesel engine, a power generator driven by motive power of the internal combustion engine, and an electric motor driven by power generated by the power generator. Motive power generated by the electric motor is transmitted to the vehicle wheels 20 of the traveling device 5. Thereby, the traveling device 5 is driven. The dump truck 2 self-travels by the motive power of the motive power generation device 7 provided in the vehicle 3. The output of the motive power generation device 7 is adjusted, so that the traveling speed of the dump truck 2 is adjusted.

The motive power generation device 7 may drive the traveling device 5 by a mechanical drive method. For example, motive power generated by the internal combustion engine may be transmitted to the vehicle wheels 20 of the traveling device 5 through a motive power transmission device.

The brake device 22 can stop the traveling of the traveling device 5. When the brake device 22 is actuated, the traveling speed of the dump truck 2 is adjusted.

The steering gear 23 can adjust the traveling direction of the traveling device 5. The traveling direction of the dump truck 2 including the traveling device 5 includes an orientation of the front section 6F of the vehicle body 6. The steering gear 23 adjusts the traveling direction of the dump truck 2 by changing the orientation of the front wheels 20F.

The speed sensor 27 detects the traveling speed of the dump truck 2. The speed sensor 27 includes a rotation speed sensor that detects a rotation speed of the vehicle wheels 20. The rotation speed the vehicle wheels 20 correlates with the traveling speed of the dump truck 2. A rotation speed value that is a value detected by the rotation speed sensor is converted into a traveling speed value of the dump truck 2. The speed sensor 27 may detect a rotation speed of the axles 21. The rotation speed of the axles 21 correlates with the traveling speed of the dump truck 2. The speed sensor 27 may detect a rotation speed of the front wheels 20F or may detect a rotation speed of the rear wheels 20R. The traveling speed of the dump truck 2 may be detected by the speed sensor 27 provided for the rear wheels 20R in a normal traveling state and the traveling speed of the dump truck 2 may be detected by the speed sensor 27 provided for the front wheels 20F in a slip traveling state in which the rear wheels 20R slip.

The position sensor 28 is arranged in the vehicle 3. The position sensor 28 includes a GPS receiver and detects the position of the dump truck 2. The position sensor 28 includes an antenna 28A for the GPS. The position sensor 28 detects the position of the antenna 28A. The antenna 28A is arranged in the dump truck 2. When the position of the antenna 28A is detected, the position of the dump truck 2 is detected. The antenna 28A receives a radio wave from the GPS satellite ST. The antenna 28A outputs a signal based on the received radio wave to the position sensor 28. The position sensor 28 detects the position of the antenna 28A based on the signal from the antenna 28A. The position sensor 28 calculates the position of the antenna 28A by converting the signal based on the radio wave from the GPS satellite ST received by the antenna 28A into an electrical signal. The position of the antenna 28A is the GPS position. When the GPS position of the antenna 28A is detected, the GPS position of the dump truck 2 is detected.

The communication system 9 includes the wireless communication device 29. The wireless communication device 29 is arranged in the vehicle 3. The wireless communication device 29 includes an antenna 29A. The wireless communication device 29 can receive data including an instruction signal transmitted from at least either one of the management device 10 and another dump truck 2. The wireless communication device 29 can transmit data to at least either one of the management device 10 and another dump truck 2.

The non-contact sensor 30 is provided in the front section 6F of the vehicle body 6. The non-contact sensor 30 contactlessly detects an object around the vehicle body 6. The non-contact sensor 30 includes a laser scanner. The non-contact sensor 30 contactlessly detects an object by using a laser beam which is detection light. The non-contact sensor 30 can detect the presence or absence of an object, a relative position with respect to the object, and a relative speed with respect to the object. The relative position with respect to the object includes the relative distance to the object and a direction in which the object is located with respect to the non-contact sensor 30.

In the embodiment, a plurality of non-contact sensors 30 are provided. In the embodiment, the non-contact sensor 30 includes a first non-contact sensor 31 and a second non-contact sensor 32 provided adjacent to the first non-contact sensor 31.

The non-contact sensor 30 may include a radar device such as a millimeter wave radar device. The radar device can contactlessly detect an object by using a radio wave.

<Non-Contact Sensor>

Figure 5:
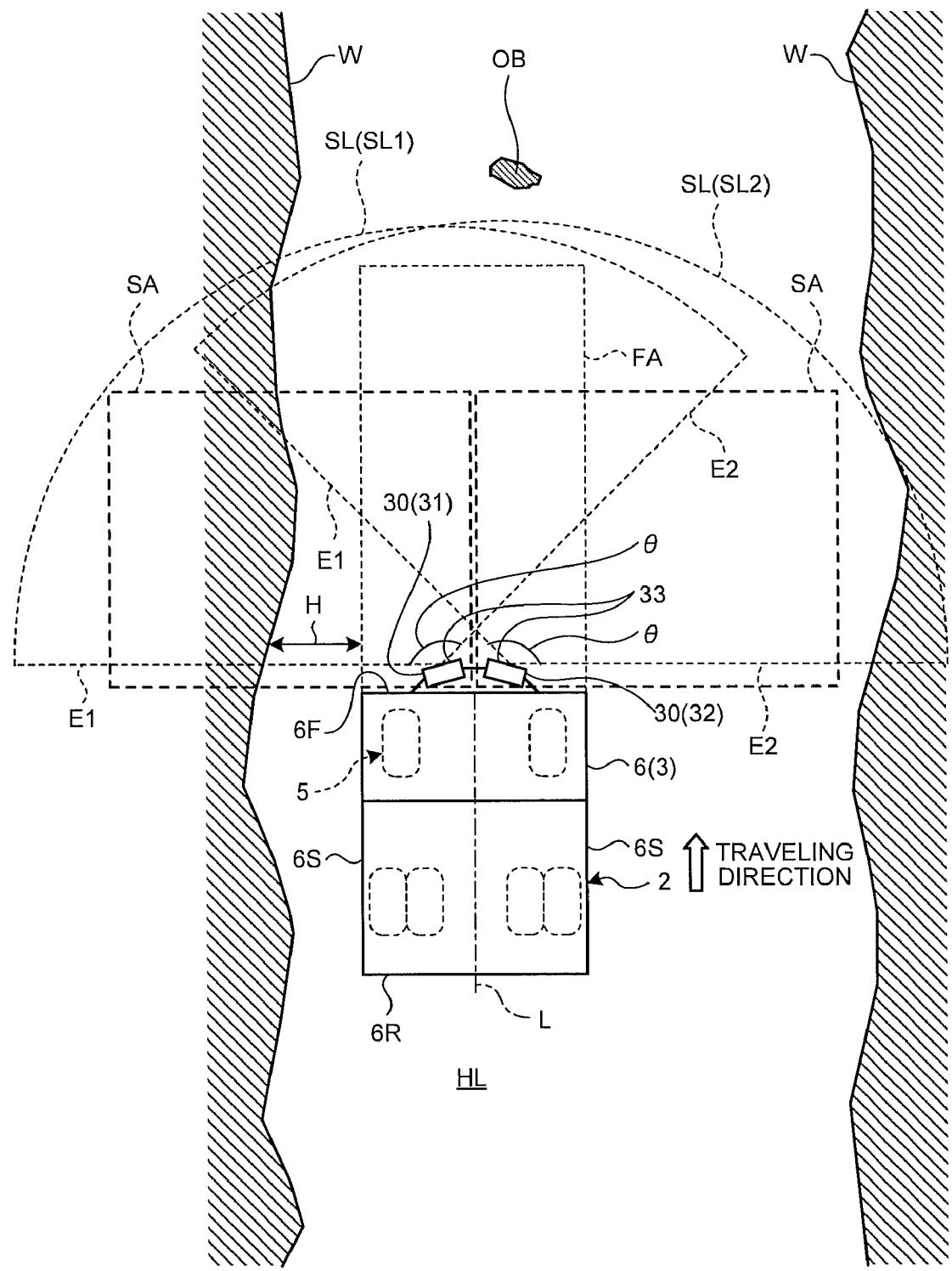
FIG. 5 is a diagram for explaining an example of a non-contact sensor according to the embodiment.

Next, the non-contact sensor 30 will be described. FIG. 5 is a schematic diagram illustrating an example of the non-contact sensor 30 according to the embodiment. As illustrated in FIG. 5, the non-contact sensor 30 is provided in the front section 6F of the vehicle body 6. The non-contact sensor 30 includes an emission unit 33 that emits a laser beam which is detection light. When the non-contact sensor 30 includes a radar device, a radio wave is emitted from the emission unit 33.

The non-contact sensor 30 can detect an object present in the forward direction of the vehicle body 6 and an object present in the lateral direction of the vehicle body 6. The forward direction of the vehicle body 6 is a forward direction of the traveling direction of the advancing dump truck 2 and includes a space in front of the vehicle body 6. The space in front of the vehicle body 6 is a space which the front section 6F of the vehicle body 6 faces. The width of the space in front of the vehicle body 6 is approximately equal to the width of the vehicle body 6. The lateral direction of the vehicle body 6 is a lateral direction of the traveling direction of the advancing dump truck 2 and includes spaces beside the space in front of the vehicle body 6. The lateral direction of the vehicle body 6 may include spaces which the side sections 6S of the vehicle body 6 face. The lateral direction of the vehicle body 6 includes the left direction and the right direction. The left direction is a left direction with respect to the traveling direction of the advancing dump truck 2 and includes a space on the left side of the space in front of the vehicle body 6 and a space which the left side section 6S of the vehicle body 6 faces. The right direction is a right direction with respect to the traveling direction of the advancing dump truck 2 and includes a space on the right side of the space in front of the vehicle body 6 and a space which the right side section 6S of the vehicle body 6 faces.

In the description below, a positional relationship between each component will be described based on the traveling direction of the advancing dump truck 2. An object present in the space in front of the vehicle body 6 of the advancing dump truck 2 is an object in front of the vehicle body 6. An object present in side spaces which are spaces beside the space in front of the vehicle body 6 is an object in the lateral direction. An object present in the left space which is a left space with respect to the space in front of the vehicle body 6 is an object in the left direction. An object present in the right space which is a right space with respect to the space in front of the vehicle body 6 is an object in the right direction. The left is the left side with respect to the width direction of the vehicle body 6 of the advancing dump truck 2. The right is the right side with respect to the width direction of the vehicle body 6 of the advancing dump truck 2.

The non-contact sensor 30 includes the first non-contact sensor 31 and the second non-contact sensor 32 provided on the immediate right side of the first non-contact sensor 31. The first non-contact sensor 31 is provided on the left side of a center line L of the vehicle body 6. The second non-contact sensor 32 is provided on the right side of the center line L of the vehicle body 6.

The center line L of the vehicle body 6 is a line connecting the center of the front section 6F and the center of the rear section 6R with respect to the width direction of the vehicle body 6 in a plane substantially parallel to a surface of the traveling path HL. The surface of the traveling path HL is a road surface of the traveling path HL. The plane substantially parallel to the surface of the traveling path HL may be a horizontal plane or may be an inclined plane that is inclined with respect to the horizontal plane when the traveling path HL is a slope. The plane substantially parallel to the surface of the traveling path HL may be assumed to be a plane parallel to the lower surface of the vehicle body 6.

The emission unit 33 of the first non-contact sensor 31 and the emission unit 33 of the second non-contact sensor 32 face different directions. The emission unit 33 of the first non-contact sensor 31 faces a forward left direction. The emission unit 33 of the second non-contact sensor 32 faces a forward right direction.

The non-contact sensor 30 has a detection area SL. At least a part of the detection area SL is defined in the forward direction of the vehicle body 6. The non-contact sensor 30 can contactlessly detect an object present in the detection area SL. The detection light emitted from the emission unit 33 scans the detection area SL. The detection area SL includes a scanning area of the detection light. The detection area SL has a shape extending radially in the horizontal direction and the vertical direction from the emission unit 33.

In the plane substantially parallel to the surface of the traveling path HL, an angle θ between one edge E1 of the detection area SL extending radially and the other edge E2 is about 110[°]. The angle θ may be defined to any value within a range greater than or equal to 100[°] and smaller than or equal to 120[°].

The detection area SL includes a first detection area SL1 of the first non-contact sensor 31 and a second detection area SL2 of the second non-contact sensor 32. In the plane substantially parallel to the surface of the traveling path HL, the edge E1 of the first detection area SL1 is orthogonal to the center line L of the vehicle body 6. In the plane substantially parallel to the surface of the traveling path HL, the edge E2 of the second detection area SL2 is orthogonal to the center line L of the vehicle body 6.

The edge E1 of the first detection area SL1 extends leftward from the front section 6F of the vehicle body 6. The edge E2 of the second detection area SL2 extends rightward from the front section 6F of the vehicle body 6. In the embodiment, in the plane substantially parallel to the surface of the traveling path HL, the edge E1 of the first detection area SL1 and the edge E2 of the second detection area SL2 are arranged on the same straight line. An angle between the edge E1 of the first detection area SL1 and the edge E2 of the second detection area SL2 is 180[°].

The edge E2 of the first detection area SL1 extends rightward of the center line L. The edge E1 of the second detection area SL2 extends leftward of the center line L. In an area in front of the vehicle body 6, a part of the first detection area SL1 and a part of the second detection area SL2 overlap with each other.

As a result, in the embodiment, the non-contact sensor 30 including the first non-contact sensor 31 and the second non-contact sensor 32 can contactlessly detect an object present in the detection area SL having an angle of 180[°] which is defined in front of the vehicle body 6.

The dump truck 2 travels the traveling path HL. The traveling device 5 travels the traveling path HL in a state in which the vehicle wheels 20 are in contact with the surface of the traveling path HL. A wall W is provided beside the traveling path HL. The wall W includes a bank provided in the mine. The wall W is provided on the side of the traveling path HL. The wall W is may be provided on the left side of the traveling path HL, may be provided on the right side of the traveling path HL, and may be provided on both sides of the traveling path HL.

In the embodiment, the position where the non-contact sensor 30 is positioned, the shape of the detection area SL, and the size of the detection area SL including the angle θ are defined so that the traveling path HL in front of the vehicle body 6 and areas beside the traveling path HL are arranged in the detection area SL when the traveling device 5 travels on the traveling path HL. When the traveling device 5 travels on the traveling path HL, the traveling path HL in front of the vehicle body 6 and areas beside the traveling path HL are arranged in the detection area SL of the non-contact sensor 30.

The traveling path HL in front of the vehicle body 6 is the traveling path HL present in a space in front of the vehicle body 6 among the entire traveling path HL. The areas beside the traveling path HL are lateral spaces beside the space in front of the vehicle body 6. The non-contact sensor 30 can contactlessly detect an object on the traveling path HL present in the space in front of the vehicle body 6. The non-contact sensor 30 can contactlessly detect an object present in the lateral spaces beside the space in front of the vehicle body 6.

In the example illustrated in FIG. 5, the traveling path HL in front of the vehicle body 6 and the left wall W of the traveling path HL are arranged in the first detection area SL1. The traveling path HL in front of the vehicle body 6 and the right wall W of the traveling path HL are arranged in the second detection area SL2. When an obstacle OB is present in the traveling path HL in front of the vehicle body 6, the first non-contact sensor 31 can detect both the obstacle OB in the traveling path HL in front of the vehicle body 6 and the left wall W of the traveling path HL. When the obstacle OB is present in the traveling path HL in front of the vehicle body 6, the second non-contact sensor 32 can detect both the obstacle OB in the traveling path HL in front of the vehicle body 6 and the right wall W of the traveling path HL.

In this way, in the embodiment, the non-contact sensor 30 can detect the obstacle OB present in the traveling path HL in front of the vehicle body 6 of the traveling dump truck 2 and both of the walls W provided beside the traveling path HL.

An output signal of the non-contact sensor 30 is outputted to a control device 50. The control device 50 detects the presence or absence of the obstacle OB in the traveling path HL in front of the vehicle body 6 based on the output signal of the non-contact sensor 30. Further, the control device 50 detects a distance between the wall W beside the traveling path HL and the vehicle body 6 of the dump truck 2 based on the output signal of the non-contact sensor 30.

<Control System>

Figure 6:
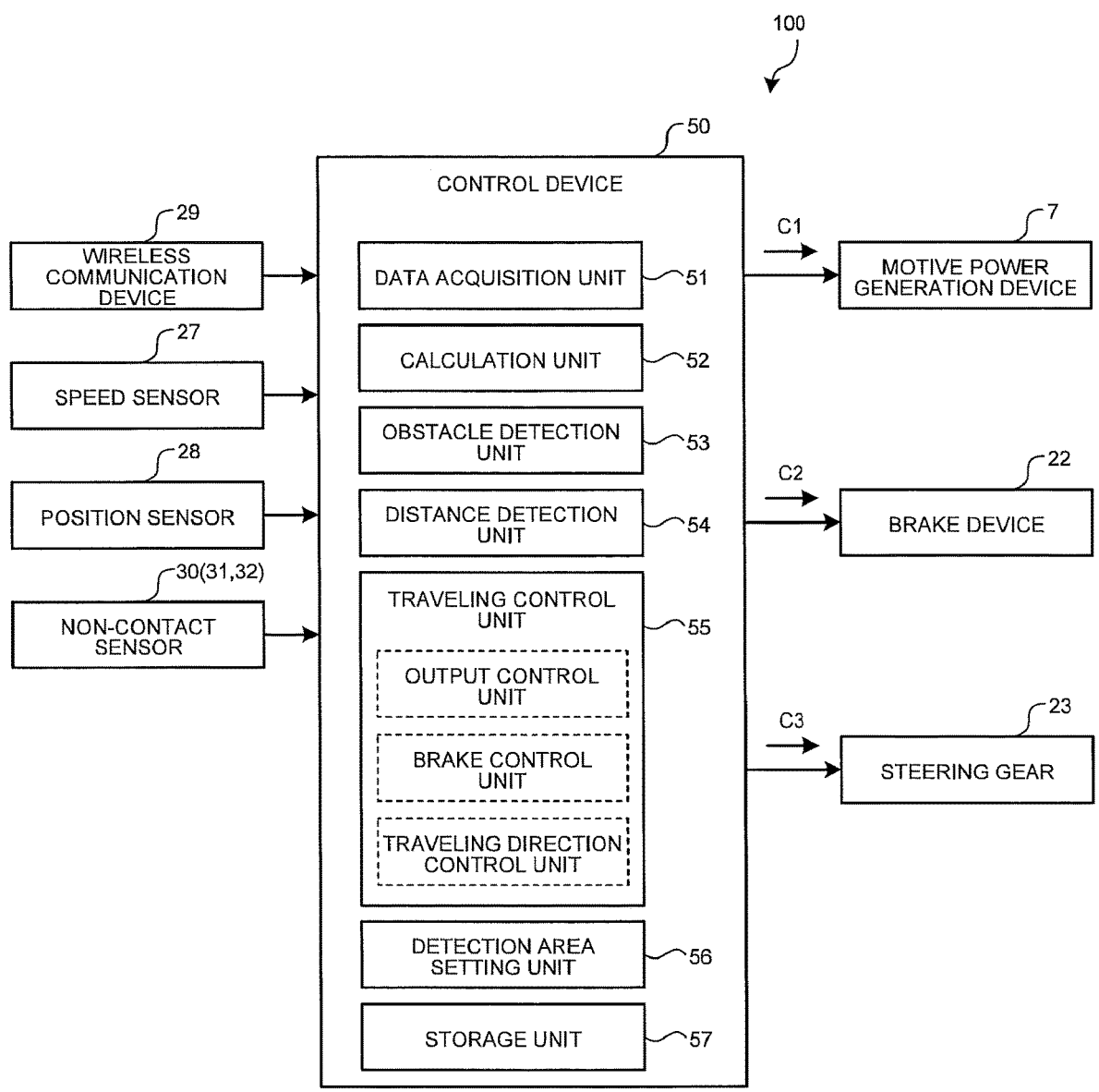
FIG. 6 is a functional block diagram illustrating an example of a control system of the dump truck according to the embodiment.

Next, an example of a control system 100 of the dump truck 2 according to the embodiment will be described. FIG. 6 is a functional block diagram illustrating an example of the control system 100 including the control device 50 mounted in the dump truck 2 according to the embodiment. The control device 50 includes a computer system. The control device 50 includes a processor such as a CPU, and a memory such as a RAM and a ROM.

As illustrated in FIG. 6, the control device 50 includes a data acquisition unit 51, a calculation unit 52, an obstacle detection unit 53, a distance detection unit 54, a traveling control unit 55, a detection area setting unit 56, and a storage unit 57.

The wireless communication device 29, the speed sensor 27, the position sensor 28, and the non-contact sensor 30 are connected to the control device 50. The data acquisition unit 51 acquires data including an instruction signal from the wireless communication device 29, data including an output signal from the speed sensor 27, data including an output signal from the position sensor 28, and data including an output signal from the non-contact sensor 30.

The wireless communication device 29 receives data from the wireless communication device 18 of the management device 10 and outputs the data to the data acquisition unit 51. The data acquisition unit 51 acquires data transmitted from the management device 10. The output signal of the speed sensor 27 is outputted to the data acquisition unit 51. The data acquisition unit 51 acquires the output signal of the speed sensor 27. The output signal of the position sensor 28 is outputted to the data acquisition unit 51. The data acquisition unit 51 acquires the output signal of the position sensor 28. The output signal of the non-contact sensor 30 is outputted to the data acquisition unit 51. The data acquisition unit 51 acquires the output signal of the non-contact sensor 30.

The calculation unit 52 calculates the traveling speed of the dump truck 2 based on the output signal of the speed sensor 27, which indicates the rotation speed of the vehicle wheels 20. Further, the calculation unit 52 calculates a moving distance of the dump truck 2 based on the output signal of the speed sensor 27 and time data from a timer included in the control device 50.

The obstacle detection unit 53 detects the obstacle OB in the traveling path HL in front of the vehicle body 6 based on the output signal of the non-contact sensor 30. The obstacle detection unit 53 causes the traveling control unit 55 to output a control signal to stop the traveling of the traveling device 5 so that the vehicle body 6 does not collide with the obstacle OB based on the output signal of the non-contact sensor 30.

The distance detection unit 54 detects a distance to the wall W beside the traveling path HL based on the output signal of the non-contact sensor 30. The distance detection unit 54 causes the traveling control unit 55 to output a control signal to adjust the traveling direction of the traveling device 5 so that the vehicle body 6 does not come into contact with the wall W based on the output signal of the non-contact sensor 30.

The traveling control unit 55 outputs the control signal that controls the traveling device 5. The traveling control unit 55 controls the traveling device 5 so that the dump truck 2 travels the traveling path HL according to the traveling condition data generated by the traveling condition data generation unit 12B of the management device 10. The traveling control unit 55 controls the traveling device 5 based on a detection result of at least one of the obstacle detection unit 53 and the distance detection unit 54.

In the embodiment, the traveling control unit 55 includes an output control unit that generates a control signal C1 outputted to the motive power generation device 7, a brake control unit that generates a control signal C2 outputted to the brake device 22, and a traveling direction control unit that generates a control signal C3 outputted to the steering gear 23.

When the obstacle detection unit 53 determines that there is the obstacle OB in the traveling path HL in front of the vehicle body 6 based on the output signal of the non-contact sensor 30, the obstacle detection unit 53 outputs an instruction signal to the traveling control unit 55 so that the dump truck 2 does not collide with the obstacle OB. The traveling control unit 55 outputs the control signal C1 to stop the traveling of the traveling device 5 to the motive power generation device 7 based on the instruction signal from the obstacle detection unit 53. The traveling control unit 55 outputs the control signal C2 to stop the traveling of the traveling device 5 to the brake device 22 based on the instruction signal from the obstacle detection unit 53. The output of the motive power generation device 7 is lowered based on the control signal C1, so that the traveling device 5 stops. The brake device 22 is actuated based on the control signal C2, so that the traveling device 5 stops.

When the distance detection unit 54 determines that the distance between the wall W and the vehicle body 6 is smaller than a predetermined threshold value based on the output signal of the non-contact sensor 30, the distance detection unit 54 outputs an instruction signal to the traveling control unit 55 so that the dump truck 2 does not come into contact with the wall W. The traveling control unit 55 outputs the control signal C3 to adjust the traveling direction of the traveling device 5 to the steering gear 23 based on the instruction signal from the distance detection unit 54. The steering gear 23 is actuated based on the control signal C3, so that the traveling device 5 can travel the traveling path HL in a state in which a distance H between the wall W and the dump truck 2 is maintained at a constant value greater than or equal to the threshold value.

The detection area setting unit 56 sets a forward area FA in front of the vehicle body 6 and a lateral area SA lateral to the forward area FA in the detection area SL. The obstacle detection unit 53 determines whether or not there is the obstacle OB in the forward area FA based on the output signal of the non-contact sensor 30. The distance detection unit 54 determines whether or not there is the wall W in the lateral area SA based on the output signal of the non-contact sensor 30.

The storage unit 57 stores various data such as the threshold value described above, which are necessary for the dump truck 2 to travel.

Figure 7:
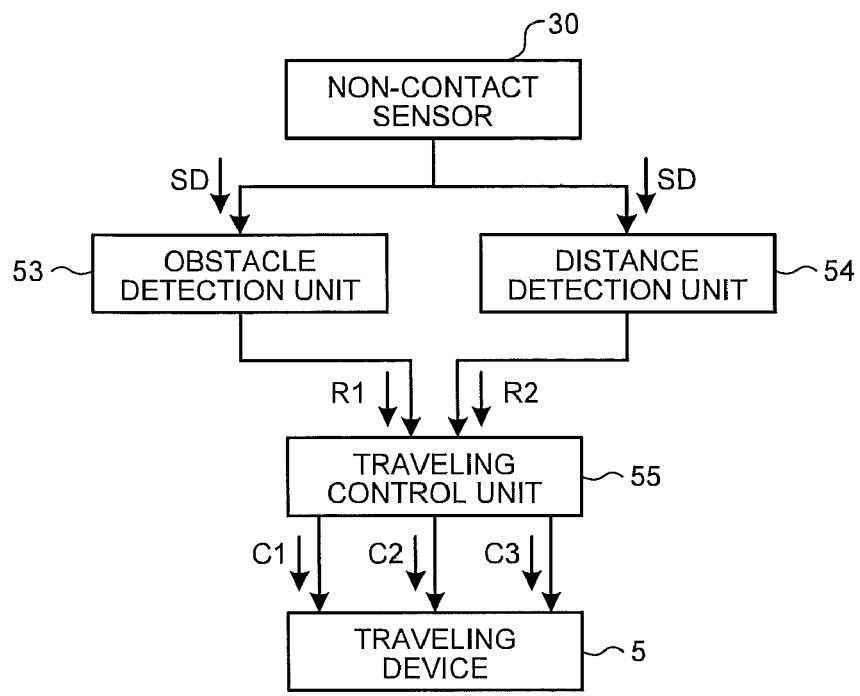
FIG. 7 is a functional block diagram illustrating an example of the control system of the dump truck according to the embodiment.

FIG. 7 is a functional block diagram obtained by extracting a part of the control system 100 according to the embodiment. As illustrated in FIG. 7, in the embodiment, the output signal SD of the non-contact sensor 30 is provided to each of the obstacle detection unit 53 and the distance detection unit 54 at the same time. In the example referring to FIG. 6, the obstacle detection unit 53 and the distance detection unit 54 are included in a single control device 50 (a computer system). However, a computer system including the obstacle detection unit 53 and a computer system including the distance detection unit 54 may be separate computer systems.

In the embodiment, the processing of the obstacle detection unit 53 and the processing of the distance detection unit 54 are separately performed. In other words, the detection processing of the distance H between the wall W and the dump truck 2 is performed by the distance detection unit 54 in parallel with the detection processing of the obstacle OB performed by the obstacle detection unit 53.

The obstacle detection unit 53 outputs an instruction signal R1 to cause the traveling control unit 55 to output at least one of the control signal C and the control signal C2 for stopping the traveling of the traveling device 5 so that the vehicle body 6 does not collide with the obstacle OB, to the traveling control unit 55, based on an output signal SD of the non-contact sensor 30.

The distance detection unit 54 outputs an instruction signal R2 to cause the traveling control unit 55 to output the control signal C3 to adjust the traveling direction of the traveling device 5 so that the vehicle body 6 does not come into contact with the wall W, to the traveling control unit 55, based on the output signal SD of the non-contact sensor 30.

The traveling control unit 55 outputs the control signal C1, the control signal C2, and the control signal C3 to control the traveling device 5 based on the instruction signal R1 from the obstacle detection unit 53 and the instruction signal R2 from the distance detection unit 54.

<Traveling Route>

Figure 8:
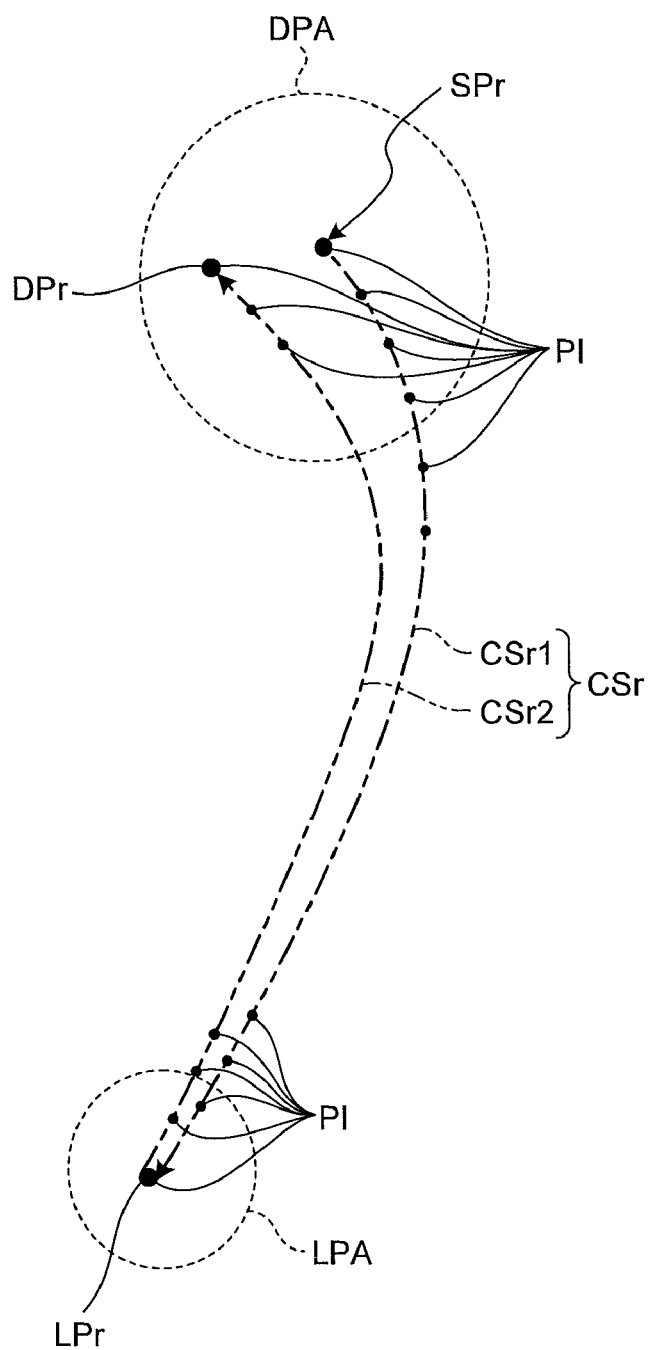
FIG. 8 is a diagram for explaining a traveling route according to the embodiment.

Next, a traveling route of the dump truck 2 according to the embodiment will be described. FIG. 8 is a diagram illustrating an example of a target traveling route CSr of the dump truck 2 according to the embodiment.

As illustrated in FIG. 8, the dump truck 2 travels from a traveling start position SPr of the earth discharging site DPA to the loading site LPA after discharging load at the earth discharging site DPA. A load is loaded on the vessel 4 of the dump truck 2 that arrives at a loading position LPr of the loading site LPA by the loading machine LM. The dump truck 2 on which the load is loaded travels toward the earth discharging site DPA. The dump truck 2 that arrives at the earth discharging site DPA discharges the load at an earth discharging position DPr of the earth discharging site DPA. A series of operations, in which the dump truck 2 starts from the traveling start position SPr toward the loading site LPA, a load is loaded on the dump truck 2 at the loading position LPr of the loading site LPA, and thereafter the dump truck 2 arrives at the earth discharging position DPr of the earth discharging site DPA and discharges the load, is referred to as one cycle of transport operation of the dump truck 2.

The traveling condition of the dump truck 2 in the one cycle of transport operation is generated by the traveling condition data generation unit 12B of the management device 10. The traveling condition data indicating the traveling condition of the dump truck 2 includes a target traveling speed and a target acceleration of the dump truck 2 and a target traveling route CSr. The target traveling route CSr is defined on the traveling path HL. The traveling condition data generated by the traveling condition data generation unit 12B is transmitted to the control device 50 of the dump truck 2 by the communication system 9 including the wireless communication device 18 and the wireless communication device 29. The traveling control unit 55 controls the traveling device 5 according to the traveling condition data supplied from the traveling condition data generation unit 12B. The traveling control unit 55 controls the motive power generation device 7 and the brake device 22 so that the traveling device 5 travels according to the target traveling speed and the target acceleration of the traveling condition data. The traveling control unit 55 controls the steering gear 23 so that the traveling device 5 travels according to the target traveling route CSr of the traveling condition data. In the embodiment, the target traveling route CSr is an aggregate of position data PI indicating a plurality of GPS positions. The target traveling route CSr includes a target onward route CSr1 from the traveling start position SPr to the loading position LPr and a target return route CSr2 from the loading position LPr to the earth discharging position DPr.

<Management Method>

Figure 9:
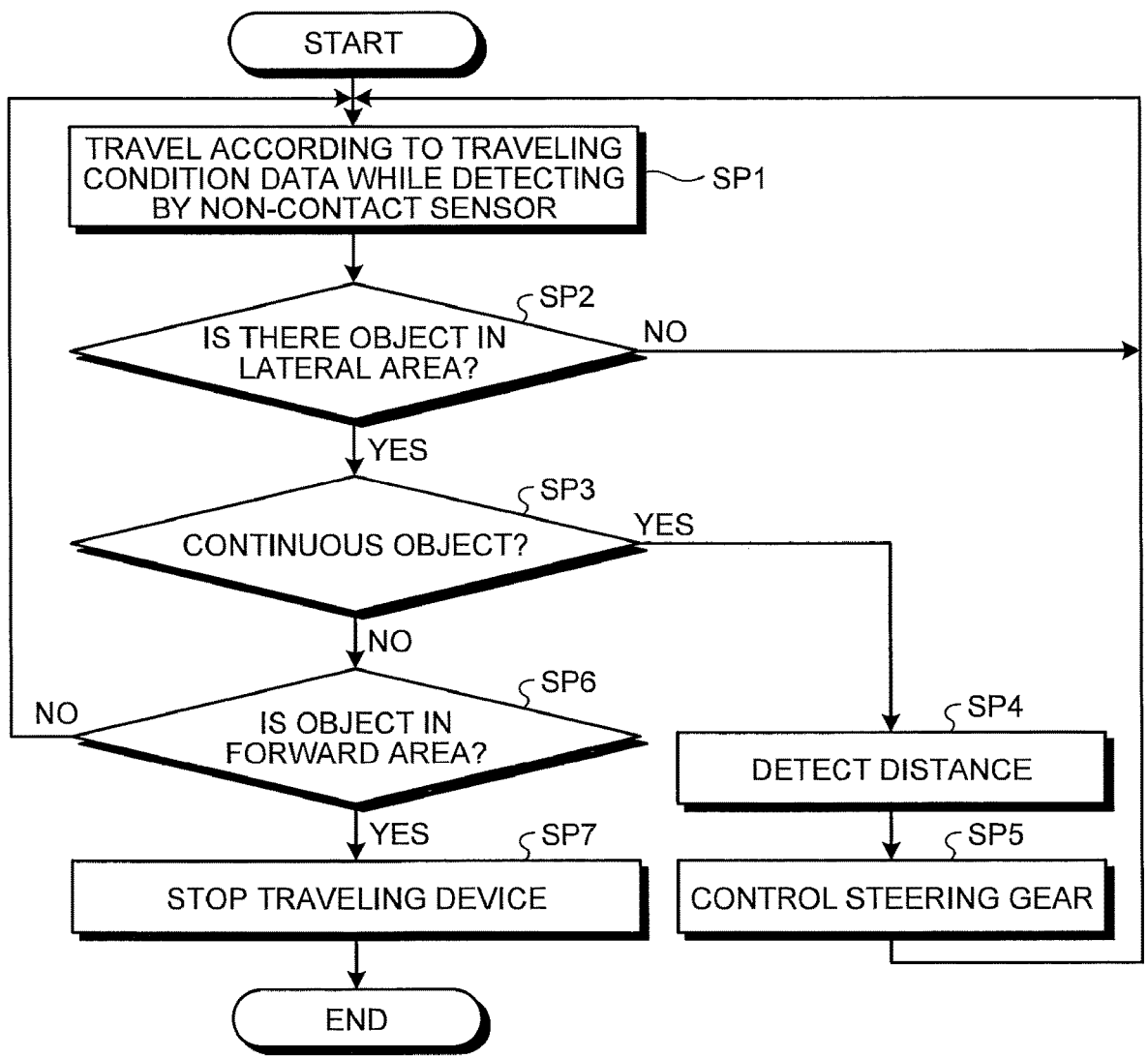
FIG. 9 is a flowchart illustrating an example of a management method of mining machine according to the embodiment.
Figure 10:
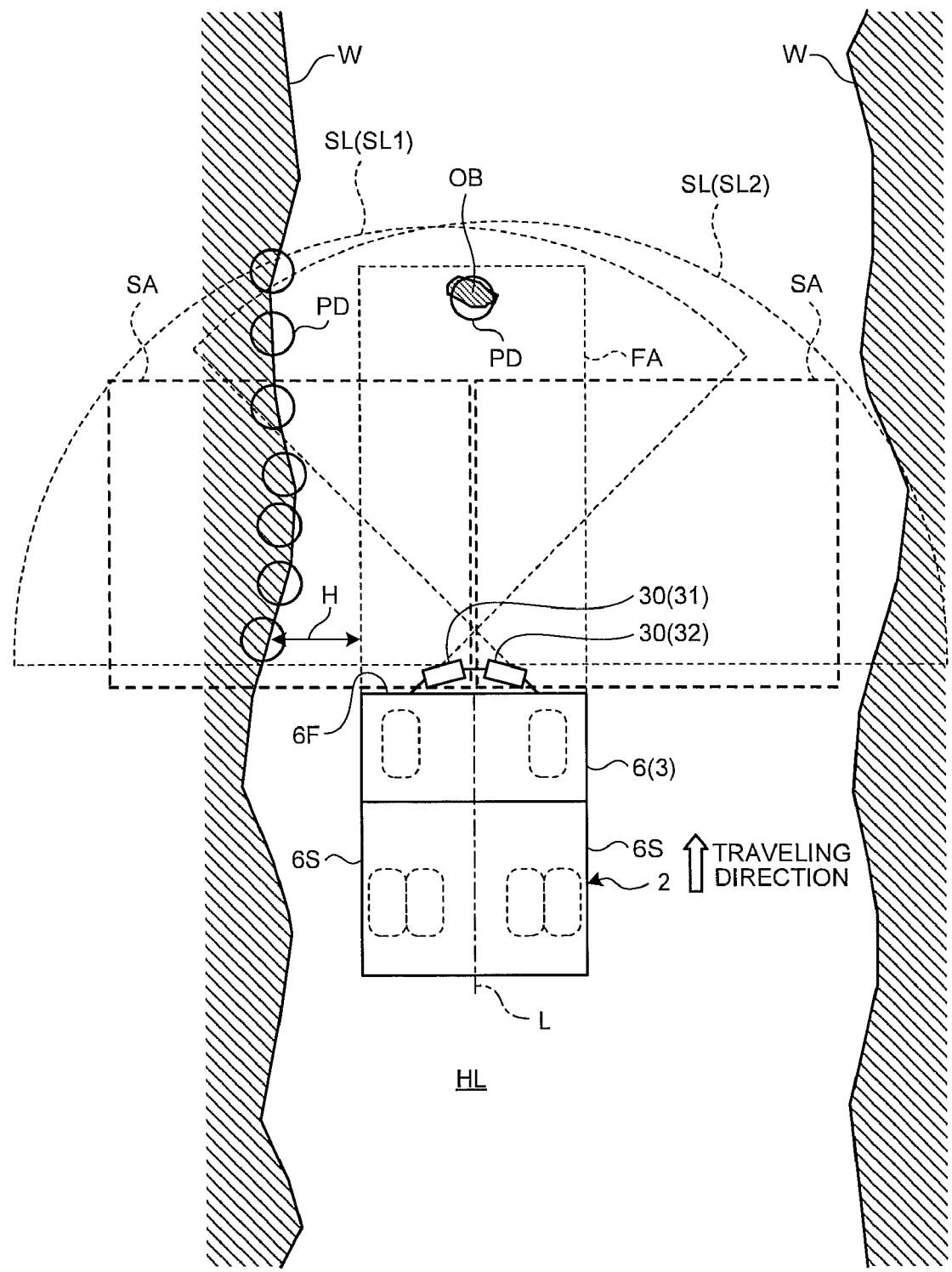
FIG. 10 is a diagram for explaining an example of the management method of mining machine according to the embodiment.
Figure 11:
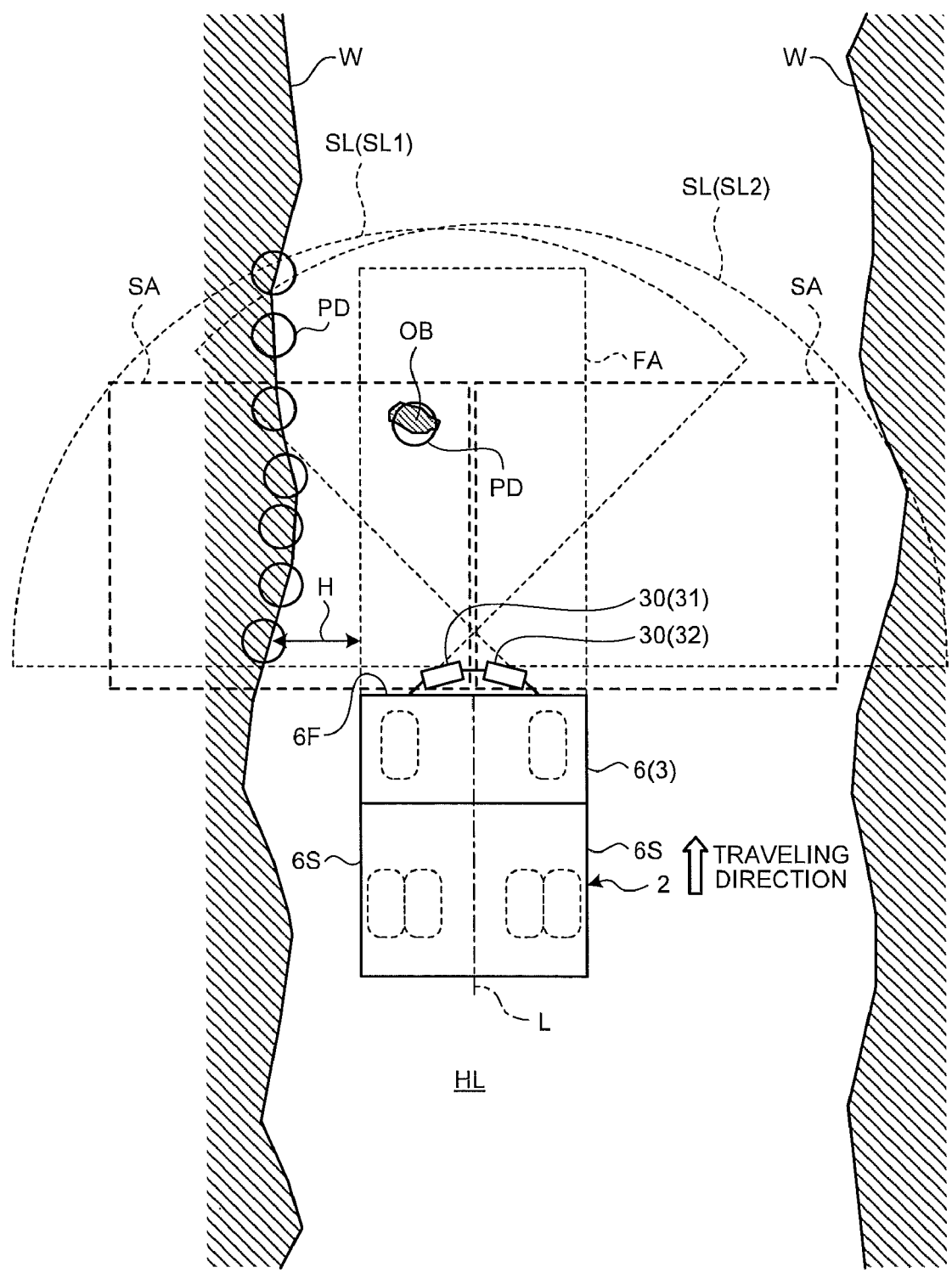
FIG. 11 is a diagram for explaining an example of the management method of mining machine according to the embodiment.

Next, an example of a management method of the dump truck 2 according to the embodiment will be described. FIG. 9 is a flowchart illustrating an example of the management method according to the embodiment. FIGS. 10 and 11 are diagrams for explaining an example of the management method according to the embodiment.

As illustrated in FIGS. 10 and 11, in the embodiment, the forward area FA in front of the vehicle body 6 and the lateral areas SA lateral to the forward area FA are set in the detection area SL. The forward area FA and the lateral areas SA are set by the detection area setting unit 56. The lateral areas SA are smaller than the detection area SL. The width of the forward area FA is approximately equal to the width of the vehicle body 6. At least a part of the lateral area SA is set so as to protrude from the forward area FA in the lateral direction.

The forward area FA is an area where an object present in the space in front of the vehicle body 6 is detected. The forward area FA is set so as to overlap with the space in front of the vehicle body 6. The lateral area SA is an area where an object present in the lateral space beside the space in front of the vehicle body 6 is detected. The lateral area SA is set so as to overlap with the lateral space.

The lateral area SA includes an area that overlaps with a part of the forward area FA and an area that does not overlap with the forward area FA. The forward area FA includes an area that overlaps with a part of the lateral area SA and an area that does not overlap with the lateral area SA.

FIGS. 10 and 11 illustrate the forward area FA and the lateral area SA set in a first detection area SL1 of the first non-contact sensor 31 and the forward area FA and the lateral area SA set in a second detection area SL2 of the second non-contact sensor 32. The forward area FA and the lateral area SA set in the first detection area SL1 will be described. The lateral area SA of the first detection area SL1 is set on the left side of the center line L. An area of the forward area FA, which is located on the left side of the center line L, overlaps with the lateral area SA. An area of the forward area FA, which is located on the right side of the center line L, does not overlap with the lateral area SA. A part of an area of the forward area FA, which is close to the vehicle body 6, overlaps with the lateral area SA. An area of the forward area FA, which is far from the vehicle body 6, does not overlap with the lateral area SA.

In the same manner as in the first detection area SL1, the forward area FA and the lateral area SA are set in the second detection area SL2 of the second non-contact sensor 32. The forward area FA of the second detection area SL2 overlaps with the forward area FA of the first detection area SL1. The lateral area SA of the second detection area SL2 is set so as to protrude rightward from the forward area FA on the right side of the center line L.

In the embodiment, the obstacle detection unit 53 determines whether or not there is the obstacle OB in the forward area FA based on the output signal SD of the non-contact sensor 30. The distance detection unit 54 determines whether or not there is the wall W in the lateral area SA based on the output signal SD of the non-contact sensor 30.

The obstacle detection unit 53 may determine whether or not there is the obstacle OB in the forward area FA based on the output signal SD of the first non-contact sensor 31 or may determine whether or not there is the obstacle OB in the forward area FA based on the output signal SD of the second non-contact sensor 32. The distance detection unit 54 determines whether or not there is the wall W in the left lateral area SA based on the output signal SD of the first non-contact sensor 31. The distance detection unit 54 determines whether or not there is the wall W in the right lateral area SA based on the output signal SD of the second non-contact sensor 32.

As illustrated in FIG. 9, the dump truck 2 travels the traveling path HL while detecting objects around the dump truck 2 by using the non-contact sensor 30. The forward area FA and the lateral area SA are set in the detection area SL of the non-contact sensor 30 by the detection area setting unit 56. The control device 50 of the dump truck 2 travels the traveling path HL according to the traveling condition data generated by the traveling condition data generation unit 12B (step SP1).

The output signal SD of the non-contact sensor 30 is outputted to each of the obstacle detection unit 53 and the distance detection unit 54. The distance detection unit 54 determines whether or not there is an object in the lateral area SA based on the output signal SD of the non-contact sensor 30 (step SP2).

As illustrated in FIGS. 10 and 11, when there is an object in the detection area SL, a detection point PD indicating the presence of the object is outputted from the non-contact sensor 30. In the embodiment, the distance detection unit 54 determines whether or not there is the detection point PD indicating the presence of an object.

In step SP2, when it is determined that there is no object in the lateral area SA (step SP2: No), the traveling of the dump truck 2 is continued according to the traveling condition data.

In step SP2, when it is determined that there is an object in the lateral area SA (step SP2: Yes), the distance detection unit 54 determines whether or not the detected object continues (step SP3).

In the embodiment, the distance detection unit 54 determines whether or not there is a plurality of detection points PD which indicate the presence of an object and which are continuously arranged in the traveling direction of the dump truck 2. When the distance detection unit 54 determines that there is a plurality of detection points PD which are continuously arranged in the traveling direction of the dump truck 2, the distance detection unit 54 determines that the object is the wall W.

As illustrated in FIGS. 10 and 11, when the object present in the lateral area SA is the wall W, the output signal SD indicating a plurality of detection points PD which continue in the traveling direction of the dump truck 2 is outputted from the non-contact sensor 30. When the distance detection unit 54 determines that there is a plurality of detection points PD which are continuously arranged in the traveling direction of the dump truck 2, the distance detection unit 54 determines that there is the wall W in the lateral area SA.

When the distance detection unit 54 determines that the detected object continues and determines that there is the wall W in the lateral area SA (step SP3: Yes), the distance detection unit 54 detects the distance H to the wall W (step SP4).

As illustrated in FIGS. 10 and 11, the distance H to the wall W detected by the distance detection unit 54 is a distance between the vehicle body 6 and the detection point PD closest to the vehicle body 6 among a plurality of detection points PD of an object arranged in the traveling direction of the dump truck 2 in the lateral area SA in a direction orthogonal to the traveling direction of the dump truck 2 (the traveling device 5). The detection point PD closest to the vehicle body 6 is the detection point PD closest to an extended line that is extended from the front section 6F of the vehicle body 6 to the wall W in a direction orthogonal to the traveling direction of the dump truck 2 among a plurality of detection points PD. The distance H between the wall W and the vehicle body 6 is a distance between an extended line that is extended from the side section 6S of the vehicle body 6 in the forward direction of the traveling direction of the dump truck 2 and the detection point PD closest to the vehicle body 6 in a direction orthogonal to the traveling direction of the vehicle 3.

The distance detection unit 54 outputs the instruction signal R2 to adjust the traveling direction of the traveling device 5 to the traveling control unit 55 so that the vehicle body 6 does not come into contact with the wall W. The traveling control unit 55 outputs the control signal C3 to control the steering gear 23 so that the vehicle body 6 of the dump truck 2 traveling the traveling path HL does not come into contact with the wall W and the distance H is maintained at a constant value greater than or equal to a predetermined threshold value. The steering gear 23 is controlled by the traveling control unit 55 (step SP5).

The traveling control unit 55 puts a higher priority on maintaining the distance H at a value greater than or equal to the threshold value than causing the traveling device 5 to travel along the target traveling route CSr. Specifically, when the traveling control unit 55 determines that the distance H becomes smaller than the threshold value if the traveling device 5 travels along the target traveling route CSr, the traveling control unit 55 controls the steering gear 23 so that the traveling device 5 travels the traveling path HL in a state in which the distance H between the wall W and the dump truck 2 is maintained at a constant value greater than or equal to the threshold value. Thereby, the dump truck 2 can continue traveling while preventing contact with the wall W.

When it is determined that the object detected in the lateral area SA is not continued and it is determined that the object is not the wall W (step SP3: No), the obstacle detection unit 53 determines whether or not the object is present in the forward area SA based on the output signal SD of the non-contact sensor 30 (step SP6).

FIG. 10 illustrates an example in which the obstacle OB which is an object is present in an area that does not overlap with the lateral area SA in the forward area FA. FIG. 11 illustrates an example in which the obstacle OB which is an object is present in an area that overlaps with the lateral area SA in the forward area FA.

In both of the examples illustrated in FIGS. 10 and 11, when there is an object in the forward area FA, the output signal SD indicating the detection point PD indicating the presence of the object is outputted from the non-contact sensor 30.

In step SP6, when it is determined that there is an object in the forward area FA (step SP6: Yes), the obstacle detection unit 53 recognizes that the object is the obstacle OB. The obstacle detection unit 53 outputs the instruction signal R1 to stop the traveling of the traveling device 5 to the traveling control unit 55 so that the vehicle body 6 does not collide with the obstacle OB. The traveling control unit 55 outputs at least one of the control signal C1 for controlling the motive power generation device 7 and the control signal C2 for controlling the brake device 22 so that the vehicle body 6 of the dump truck 2 traveling the traveling path HL does not collide with the obstacle OB. Thereby, the traveling device 5 is stopped and the collision of the dump truck 2 and the obstacle OB is avoided (step SP7).

In step SP6, when it is determined that there is not an object in the forward area FA (step SP6: No), the obstacle detection unit 53 determines that the object is neither the obstacle OB nor the wall W. In other words, the obstacle detection unit 53 determines that the traveling of the dump truck 2 is not interrupted by the object. The traveling of the dump truck 2 is continued.

As described above, in the embodiment, the obstacle detection unit 53 and the distance detection unit 54 may be included in a single computer system, or a computer system including the obstacle detection unit 53 and a computer system including the distance detection unit 54 may be separate computer systems.

<Effects>

As described above, according to the embodiment, the non-contact sensor 30 that detects the distance H between the wall W provided beside the traveling path HL and the dump truck 2 is provided in the front section 6F of the vehicle body 6. Therefore, foreign objects such as dirt and dust are prevented from attaching to the non-contact sensor 30 as compared with a case in which the non-contact sensor 30 is provided in the side section 6S of the vehicle body 6. When the dump truck 2 travels the traveling path HL that is an unpaved path, if the non-contact sensor 30 is provided in the side section 6S of the vehicle body 6, it is highly probable that dirt or dust scattered from the traveling path HL attaches to the non-contact sensor 30. When the non-contact sensor 30 is provided in the side section 6S of the vehicle body 6, it is highly probable that the non-contact sensor 30 comes into contact with the wall W when the dump truck 2 travels the traveling path HL where the wall W is provided. When foreign objects are attached to the non-contact sensor 30 or the non-contact sensor 30 comes into contact with the wall W, the detection accuracy of the non-contact sensor 30 degrades, so that it may be difficult to stably detect the distance H between the wall W and the dump truck 2.

According to the embodiment, the non-contact sensor 30 that detects the distance H between the wall W and the dump truck 2 is provided in the front section 6F of the vehicle body 6 of the dump truck 2, and the position of the non-contact sensor 30, the shape of the detection area SL, and the size of the detection area SL are adjusted so that an area beside the traveling path HL is arranged in the detection area SL of the non-contact sensor 30. Therefore, degradation of the detection accuracy of the non-contact sensor 30 is suppressed, and the distance H between the wall W and the dump truck 2 is stably detected. Therefore, it is possible to control the traveling device 5 so that the dump truck 2 travels the traveling path HL in a state in which the distance H is maintained at a constant value greater than or equal to the threshold value.

According to the embodiment, the position of the non-contact sensor 30, the shape of the detection area SL, and the size of the detection area SL are adjusted so that the traveling path HL in front of the vehicle body 6 is arranged in the detection area SL of the non-contact sensor 30 provided in the front section 6F of the vehicle body 6. The non-contact sensor 30 can detect the obstacle OB in front of the dump truck 2. Therefore, when the obstacle OB is detected, the control device 50 can take measures to avoid collision of the dump truck 2 and the obstacle OB.

In the embodiment, the non-contact sensor 30 has both of a function of a distance sensor that detects the distance H between the wall W and the dump truck 2 and a function of an obstacle sensor that detects the obstacle OB in front of the dump truck 2. Therefore, the device is simplified and the cost is reduced.

In the embodiment, the non-contact sensor 30 is provided in the front section 6F of the vehicle body 6 and has a forward obstacle detection function that detects the obstacle OB in front of the dump truck 2, so that an apparatus including the non-contact sensor 30 arranged in the front section 6F of the vehicle body 6 is protected.

In the embodiment, the traveling device 5 includes the brake device 22 that can stop traveling and the steering gear 23 that can adjust the traveling direction. The obstacle detection unit 53 generates the instruction signal R1 to cause the traveling control unit 55 to output at least one of the control signal C1 and the control signal C2 for stopping the traveling of the traveling device 5 so that the vehicle body 6 does not collide with the obstacle OB based on the output signal SD of the non-contact sensor 30. The distance detection unit 54 generates the instruction signal R2 to cause the traveling control unit 55 to output the control signal C3 to adjust the traveling direction of the traveling device 5 so that the vehicle body 6 does not come into contact with the wall W based on the output signal SD of the non-contact sensor 30. Thereby, the dump truck 2 can avoid the collision with the obstacle OB while maintaining the distance H to the wall W.

In the embodiment, the non-contact sensor 30 includes the first non-contact sensor 31 and the second non-contact sensor 32 provided adjacent to the first non-contact sensor 31. Thereby, even when an operation failure of one non-contact sensor 30 (for example, the second non-contact sensor 32) occurs, it is possible to continuously detect an object by using the other non-contact sensor 30 (for example, the first non-contact sensor 31). The number of the non-contact sensors 30 may be one or may be three or more.

In the embodiment, the detection area setting unit 56 is provided which sets the forward area FA in front of the vehicle body 6 and the lateral area SA lateral to the forward area FA in the detection area SL. The obstacle detection unit 53 determines whether or not there is the obstacle OB in the forward area FA based on the output signal SD of the non-contact sensor 30. The distance detection unit 54 determines whether or not there is the wall W in the lateral area SA based on the output signal SD of the non-contact sensor 30. Therefore, it is possible to accurately detect each of the wall W and the obstacle OB.

According to the embodiment, the distance H to the wall W detected by the distance detection unit 54 includes a distance between the vehicle body 6 and the detection point PD closest to the vehicle body 6 among a plurality of detection points PD of an object in the lateral area SA in a direction orthogonal to the traveling direction of the dump truck 2. Thereby, it is possible to accurately perform the control not to cause the dump truck 2 to come into contact with the wall W based on the distance H.

Figure 12:
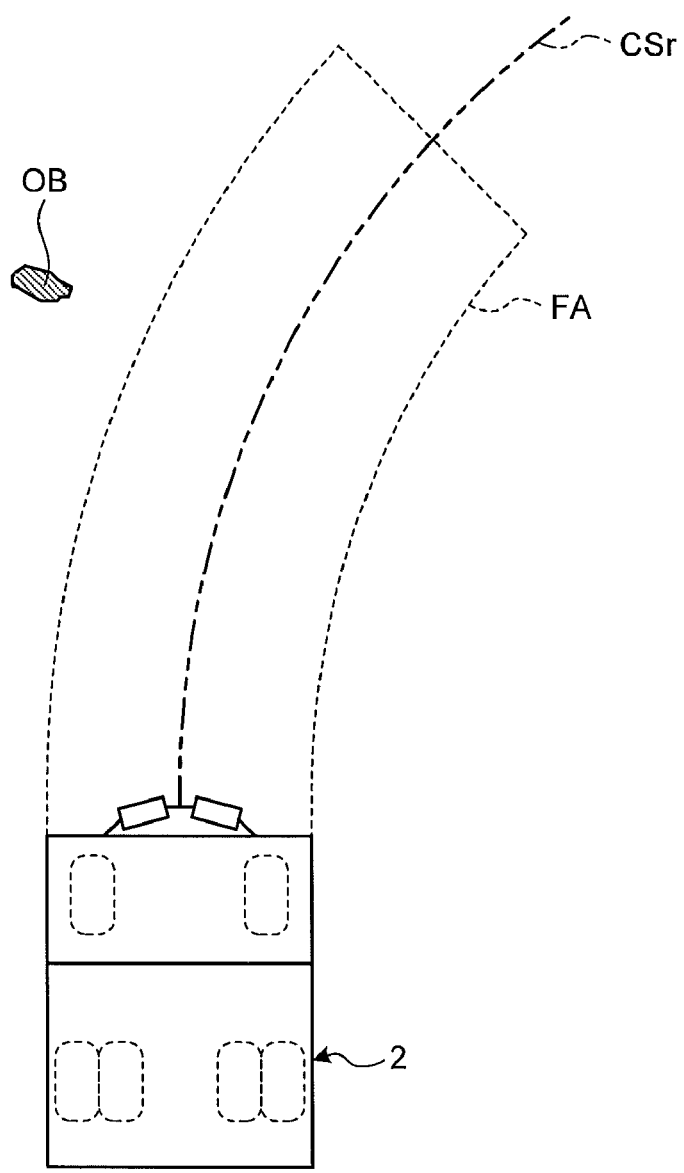
FIG. 12 is a diagram illustrating an example of a forward area according to the embodiment.

In the embodiment, the traveling condition data, which is outputted from the traveling condition data generation unit 12B of the management device 10 and which indicates the traveling condition of the traveling device 5, is acquired by the data acquisition unit 51 through the wireless communication device 29. The detection area setting unit 56 may change the shape of the forward area FA based on the traveling condition data acquired by the data acquisition unit 51. For example, as illustrated in FIG. 12, when the target traveling route CSr curves, the forward area FA may curve along the target traveling route CSr. Thereby, even when the obstacle OB is present on the traveling path HL, if the obstacle OB is not present in a traveling course of the dump truck 2, the obstacle OB is not arranged in the forward area FA. Thereby, the obstacle detection unit 53 need not output the instruction signal R1 to stop the traveling device 5. Therefore, useless stop of the dump truck 2 is avoided, so that degradation of productivity of the mine is suppressed.

As illustrated in FIGS. 10 and 11, when the wall W is provided on both sides of the traveling path HL, the traveling device 5 may be controlled so that the distance H between the right wall W and the dump truck 2 is maintained at a constant value or may be controlled so that the distance H between the left wall W and the dump truck 2 is maintained at a constant value. The traveling device 5 may be controlled so that either one of the walls W provided on both sides of the traveling path HL is selected and the distance H between the selected wall W and the dump truck 2 is maintained at a constant value. Either one of the walls W provided on both sides of the traveling path HL may be selected based on an instruction from the management device 10. A predetermined one of the walls W provided on both sides of the traveling path HL may be selected. The traveling device 5 may be controlled so that the distance H between the left wall W and the dump truck 2 is maintained at a constant value and the distance H between the right wall W and the dump truck 2 is maintained at a constant value.

Figure 13:
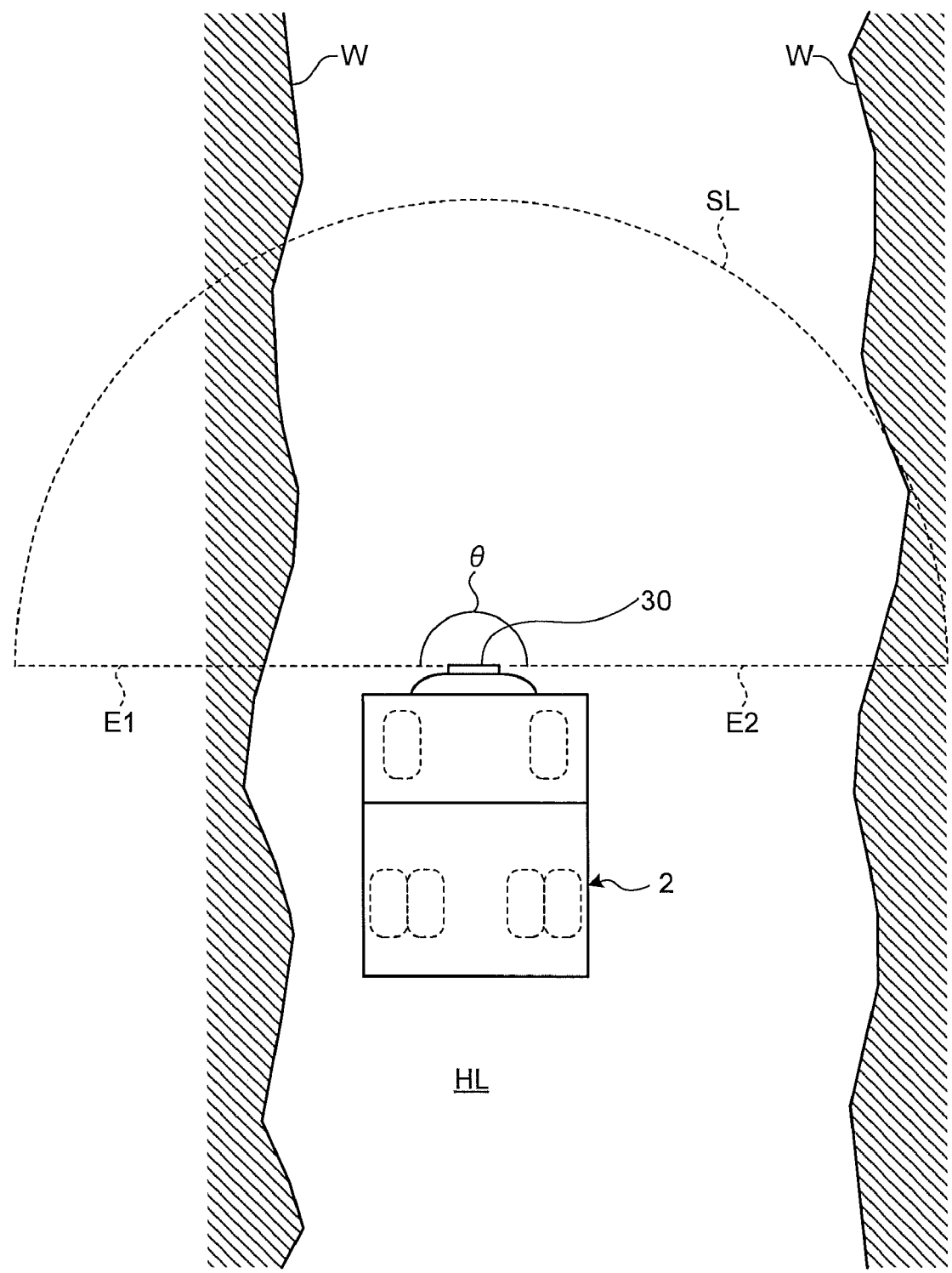
FIG. 13 is a diagram for explaining an example of a non-contact sensor according to the embodiment.

As illustrated in FIG. 13, the number of the non-contact sensors 30 may be one. An angle θ between one edge E1 and the other edge E2 of the detection area SL of one non-contact sensor 30 is set to 180[°], so that the non-contact sensor 30 can detect both of the left and right side walls W.

Figure 14:
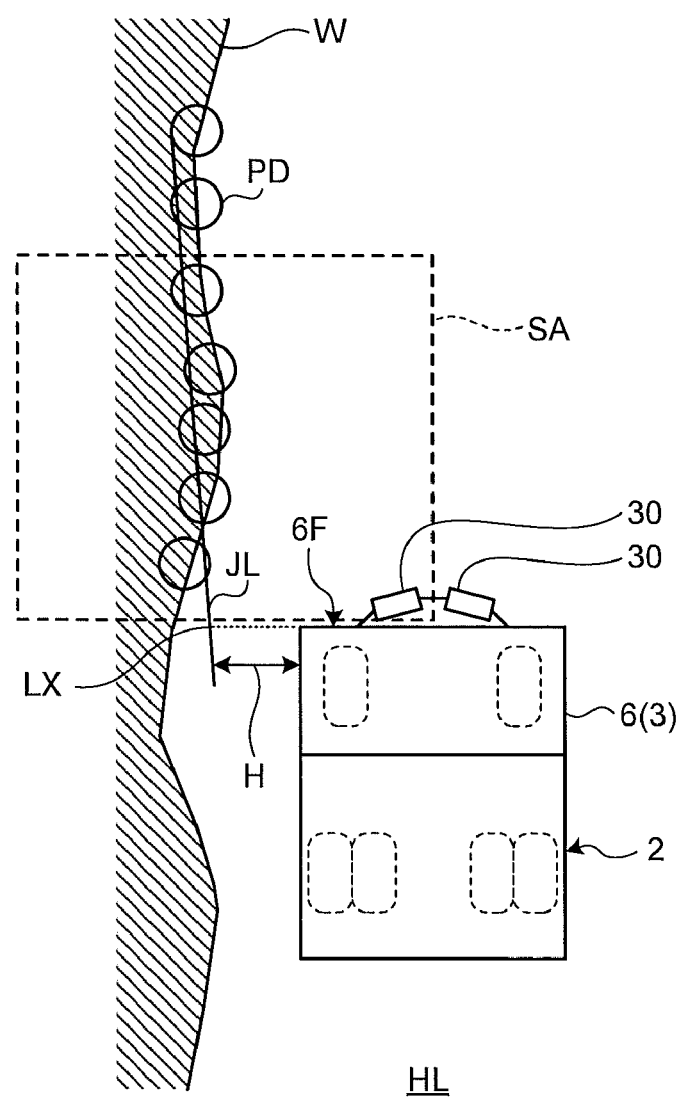
FIG. 14 is a diagram for explaining an example of a non-contact sensor according to the embodiment.

In the embodiment described above, the distance H to the wall W detected by the distance detection unit 54 is a distance between the vehicle body 6 and the detection point PD closest to the vehicle body 6 among a plurality of detection points PD of an object in the lateral area SA. As illustrated in FIG. 14, the distance detection unit 54 may obtain a least squares approximation straight line JL that passes through a plurality of detection points PD arranged in the traveling direction of the dump truck 2 and obtain an intersection point LX between the least squares approximation straight line JL and a straight line passing through the front section 6F of the vehicle body 6. In the example illustrated in FIG. 14, the distance H is a distance between the intersection point LX and the vehicle body 6.

In the embodiment described above, the dump truck 2 is provided with the obstacle detection unit 53, the distance detection unit 54, the traveling control unit 55, and the detection area setting unit 56. The processing device 12 of the management device 10 may have at least one of the functions of the obstacle detection unit 53, the distance detection unit 54, the traveling control unit 55, and the detection area setting unit 56. The output signal SD of the non-contact sensor 30 may be outputted to the processing device 12 through the communication system 9. For example, when the processing device 12 includes the obstacle detection unit 53, the obstacle detection unit 53 of the processing device 12 detects the obstacle OB in the traveling path HL in front of the vehicle body 6 based on the output signal SD of the non-contact sensor 30 acquired through the communication system 9. When the processing device 12 includes the distance detection unit 54, the distance detection unit 54 of the processing device 12 detects the distance H between the wall W and the dump truck 2 based on the output signal SD of the non-contact sensor 30 acquired through the communication system 9. When the processing device 12 includes the traveling control unit 55, the traveling control unit 55 of the processing device 12 generates the control signals (C1, C2, and C3) that control the traveling device 5 based on the detection result of at least one of the obstacle detection unit 53 and the distance detection unit 54 and transmits the generated control signals to the dump truck 2 through the communication system 9. The traveling device 5 of the dump truck 2 is controlled so that the vehicle body 6 does not collide with the obstacle OB or the vehicle body 6 does not come into contact with the wall W based on the control signals from the processing device 12, which are acquired through the communication system 9.

In the embodiment described above, the presence of the wall W is determined by detecting continuous detection points PD (step SP3) and the distance H to the wall W is detected. However, the processing in step SP3 may be omitted. In this case, a distance to the detection point PD closest to the vehicle body 6 among a plurality of detected detection points PD may be detected and the distance may be determined to be the distance H between the wall W and the vehicle body 6.

Other Embodiments

Figure 15:
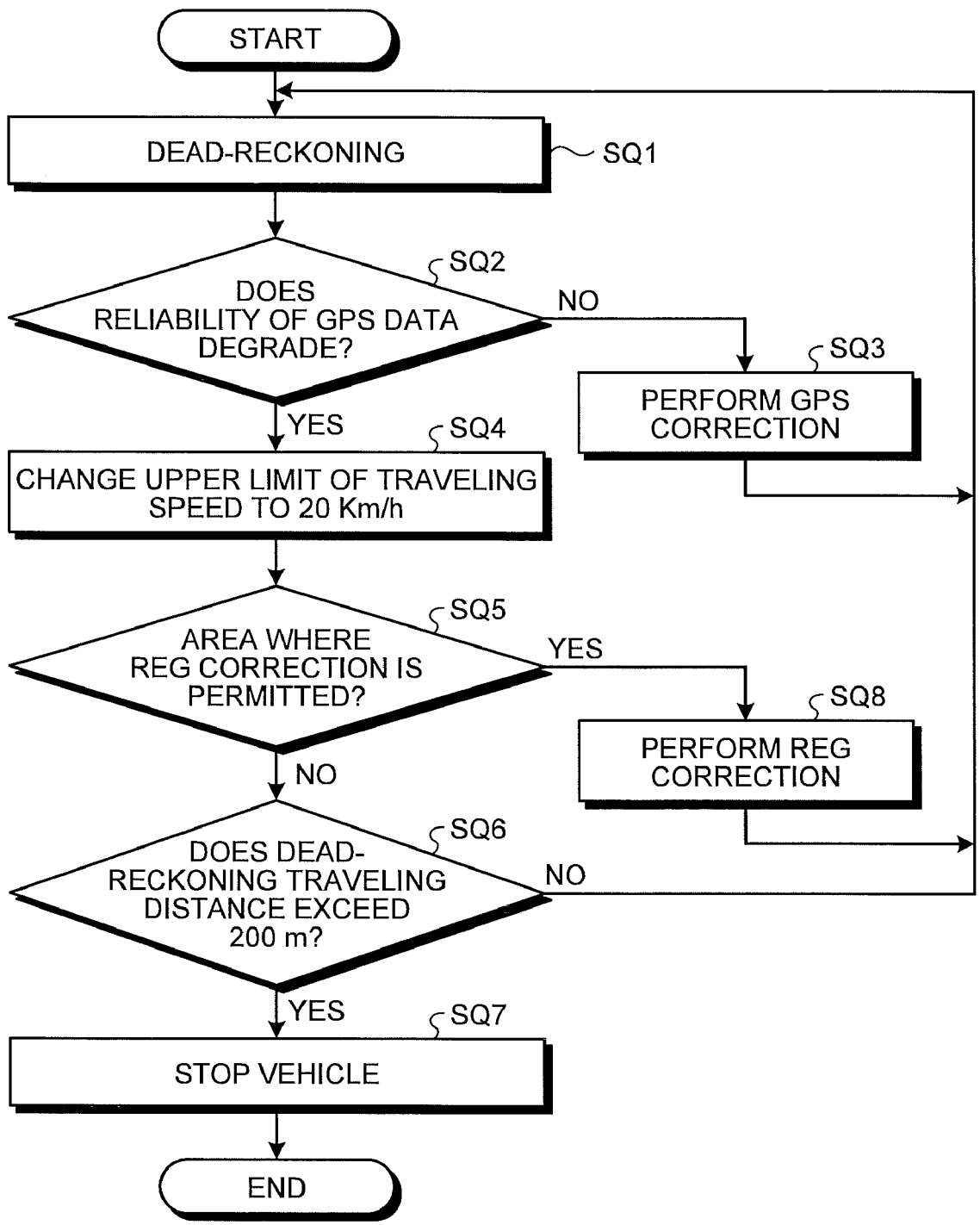
FIG. 15 is a flowchart illustrating an example of a management method of mining machine according to the embodiment.

The dump truck 2 may be managed by a management method illustrated in the flowchart of FIG. 15. In the management method to be described with reference to FIG. 15, the distance (roadside measurement distance) H between the wall W and the vehicle body 6 is detected by the non-contact sensor 30. The control device 50 controls the traveling device 5 so that the distance H is maintained at a constant value. The target traveling route CSr is set a certain distance away from the wall W (in this example, 6 m away from the wall W as an example). The control device 50 compares the distance H detected by using the non-contact sensor 30 with the certain distance (6 m) and corrects the position of the vehicle 3 based on a difference in the comparison (REG correction).

The REG correction is a correction in which the distance H and a certain distance (6 m) is compared under the assumption that the target traveling route CSr is set a certain distance (6 m) away from the wall W, and the position of the dump truck 2 is corrected based on a difference in the comparison.

The control device 50 controls the steering gear 23 so that the dump truck 2 (the vehicle) travels along the target traveling route CSr by dead-reckoning (step SQ1).

The dead-reckoning (DR) is a method in which the position of the dump truck 2 is estimated from the orientation of the dump truck 2 (the vehicle) (for example, calculated from integration of the angular velocity measured by a gyro) and the moving distance (for example, integration of the vehicle speed calculated from the number of pulses of a tire pulse sensor and the tire diameter), and the dump truck 2 travels by controlling the steering gear so as to maintain the target traveling route CSr. Although the measurement frequency is high, the integration error is accumulated, so that some form of position correction is required. The control device 50 integrates the dead-reckoning traveling distance.

The control device 50 determines a status of GPS data (degree of reliability of the position data of the dump truck 2) (step SQ2).

In step SQ2, when it is determined that the degree of reliability of the position data is high (step SQ2: No), the control device 50 controls the traveling device 5 and corrects the position of the dump truck 2 based on the position data acquired from the GPS (GPS correction) (step SQ3). The control device 50 resets the dead-reckoning traveling distance and returns to step SQ1.

The GPS correction is to correct the position of the dump truck 2 by using absolute position data acquired from the GPS satellite ST. The position acquisition frequency is relatively slow (slower than the measurement frequency of the dead-reckoning).

In step SQ2, when it is determined that the degree of reliability of the position data is low (step SQ2: Yes), the control device 50 limits the traveling speed of the dump truck 2. Specifically, if a target value of the traveling speed of the dump truck 2 is higher than or equal to 20 km/h when the control device 50 determines that the degree of reliability of the position data is low, the control device 50 re-sets the upper limit of the traveling speed of the dump truck 2 to 20 km/h (step SQ4).

The control device 50 determines whether or not the position of the dump truck 2 is in an area where the REG correction is permitted based on information from the management device 10 (step SQ5). The area where the REG correction is permitted is a nearly straight traveling path HL where a bank (wall W) is formed.

In step SQ5, when it is determined that the position of the dump truck 2 is not in an area where the REG correction is permitted (step SQ5: No), the control device 50 determines whether or not the dead-reckoning traveling distance exceeds 200 m (step SQ6).

In step SQ5, when it is determined that the position of the dump truck 2 is in an area where the REG correction is permitted (step SQ5: Yes), the control device 50 compares the distance H with the certain distance (6 m) and corrects the position of the dump truck 2 based on a difference in the comparison. In other words, the control device 50 performs the REG correction (step SQ8). The control device 50 resets the dead-reckoning traveling distance and returns to step SQ1.

In step SQ6, when it is determined that the dead-reckoning traveling distance does not exceed 200 m (step SQ6: No), the control device 50 returns to step SQ1.

In step SQ6, when it is determined that the dead-reckoning traveling distance exceeds 200 m (step SQ6: Yes), the control device 50 determines that it is highly probable that an accumulated position error is large and stops the traveling of the dump truck 2 (step SQ7). In other words, the control device 50 brings the dump truck 2 to a stop.

When the dump truck 2 is traveling, if it is determined that the roadside measurement distance H is smaller than or equal to 3 m, the control device 50 determines that it is highly probable that the dump truck 2 will collide with the wall W and stops the traveling of the dump truck 2. In other words, the control device 50 brings the dump truck 2 to a stop.

According to the present embodiment, in addition to the effects of the previous embodiment, it is possible to correct the position of the vehicle (the dump truck 2) and continue the dead-reckoning traveling based on the distance H to the wall W even when the GPS correction cannot be performed during the dead-reckoning traveling.

In the embodiments described above, the dump truck 2 stops in order to avoid the collision with the obstacle OB. However, it is not limited to this. To avoid the collision with the obstacle OB, the dump truck 2 may decelerate and the dump truck 2 may travel so as to avoid the obstacle OB by an operation of the steering gear 23 of the dump truck 2.

In the embodiments described above, the dump truck 2, which is an unmanned vehicle, is operated based on an instruction signal from the control facility 8. The unmanned vehicle may be an autonomous unmanned vehicle.

The components described in the above embodiments may be applied to a manned vehicle. For example, in order to maintain the distance H between the manned vehicle and the wall W at a predetermined value, an alarm may be issued to a driver in a driver's cabin by an alarming device including a buzzer, a lamp, and a display device based on the distance H and/or one or both of the brake device and the steering gear of the manned vehicle may be interventionally controlled.

The components of the embodiments described above include components which those skilled in the art can easily perceive, substantially identical components, and components within an equivalent range. It is possible to properly combine components of the embodiments described above. Alternatively, some components may not be used.

REFERENCE SIGNS LIST

1 Management system
2 Dump truck (Mining machine)
3 Vehicle
4 Vessel
5 Traveling device
6 Vehicle body
6F Front section
6R Rear section
6S Side section
7 Motive power generation device
8 Control facility
9 Communication system
10 Management device
11 Computer system
12 Processing device
12A Data processing unit
12B Traveling condition data generation unit
13 Storage device
15 Input/output unit
16 Display device
17 Input device
18 Wireless communication device
20 Vehicle wheel
20F Front wheel
20R Rear wheel
21 Axle
21F Axle
21R Axle
22 Brake device
23 Steering gear
27 Speed sensor
28 Position sensor
28A Antenna
29 Wireless communication device
29A Antenna
30 Non-contact sensor
31 First non-contact sensor
32 Second non-contact sensor
33 Emission unit
50 Control device
51 Data acquisition unit
52 Calculation unit
53 Obstacle detection unit
54 Distance detection unit
55 Traveling control unit
56 Detection area setting unit
57 Storage unit
100 Control system
CSr Target traveling route
DPA Earth discharging site
E1 Edge
E2 Edge
FA Forward area
HL Traveling path
LM Loading machine
LPA Loading site
OB Obstacle
SA Lateral area
SD Output signal
ST GPS satellite
W Wall

The invention claimed is:

1. An unmanned mining machine comprising:
a traveling device configured to travel a traveling path in a mine;
a vehicle body supported by the traveling device;
a non-contact sensor provided in a front section of the vehicle body, configured to contactlessly detect an object within a detection area thereof including both a forward area in front of the vehicle body and a lateral area lateral to the forward area in the detection area, and arranged so that the detection area includes an area on the traveling path in front of the vehicle body and an area beside the traveling path when the traveling device travels;
an obstacle detection unit configured to detect an obstacle in the traveling path in front of the vehicle body based on an output signal of said non-contact sensor;
a distance detection unit configured to detect a distance to a wall beside the traveling path based on an output signal of said non-contact sensor; and
a traveling control unit configured to control the traveling device;
wherein
the distance detection unit determines whether or not there is a detection point indicating the presence of an object based on the output signal of the non-contact sensor,
when the distance detection unit determines that there is the detection point indicating the presence of the object, the distance detection unit determines whether or not there is a plurality of detection points which indicate the presence of the object and which are continuously arranged in the traveling direction of the traveling device,
when the distance detection unit determines that there is the plurality of detection points which indicate the presence of the object and which are continuously arranged in the traveling direction of the traveling device, the distance detection unit determines that the object is the wall, when the distance detection unit determines that the object is the wall, the distance detection unit detects the distance to the wall and outputs an instruction signal to adjust the traveling direction of the traveling device to the traveling control unit so that the vehicle body does not come into contact with the wall, when the distance detection unit determines that there is not the plurality of detection points which indicate the presence of the object and which are continuously arranged in the traveling direction of the traveling device, the obstacle detection unit determines whether or not the object is present in front of the vehicle body based on the output signal of the non-contact sensor, when the obstacle detection unit determines that the object is present in front of the vehicle, the obstacle detection unit recognizes that the object is the obstacle and outputs an instruction signal to the traveling control unit so that the vehicle body does not collide with the obstacle, the traveling control unit controls the traveling device so that the distance to the wall is maintained constant based on the instruction signal from the distance detection unit, and the traveling control unit controls the traveling device so as not to come into collision based on the instruction signal from the obstacle detection unit.

2. The mining machine according to claim 1, further comprising:

a motive power generation device configured to generate motive power, wherein the traveling device is driven by motive power generated by the motive power generation device, and includes a brake device configured to stop traveling and a steering gear configured to adjust a traveling direction, the obstacle detection unit causes the traveling control unit to output at least one of a power control signal for controlling the motive power generation device, a brake control signal for controlling the brake device and a steering control signal for controlling the steering gear so that the vehicle body does not collide with the obstacle based on the output signal of the non-contact sensor, and the distance detection unit causes the traveling control unit to output a steering control signal for controlling the steering gear so that the vehicle body does not come into contact with the wall based on the output signal of the non-contact sensor.

3. The mining machine according to claim 1, wherein the non-contact sensor includes a first non-contact sensor and a second non-contact sensor provided adjacent to the first non-contact sensor across a center line of the vehicle body, the first non-contact sensor and the second non-contact sensor face different directions, the detection area includes a first detection area of the first non-contact sensor and a second detection area of the second non-contact sensor, the first detection area and the second detection area respectively have a shape extending radially, which partially overlap in front of the vehicle body, in the plane substantially parallel to the surface of the traveling path, and one edge of the first detection area and one edge of the second detection area extend laterally from the front section of the vehicle body, which are orthogonal to the center line of the vehicle body, and which are arranged on the same straight line, in the plane substantially parallel to the surface of the traveling path.

4. The mining machine according to claim 3, further comprising:

a detection area setting unit that sets the forward area in front of the vehicle body and the lateral area lateral to the forward area in the detection area, wherein the first non-contact sensor faces a forward left direction, the second non-contact sensor faces a forward right direction, the lateral area includes a first lateral area set in the first detection area and a second lateral area set in the second detection area, the detection area setting unit sets the first lateral area on the left side of the center line and the second lateral area on the right side of the center line, an area located on the left side of the center line within the forward area overlaps with the first lateral area and does not overlap with the second lateral area, an area located on the right side of the center line within the forward area does not overlap with the first lateral area and overlaps with the second lateral area, a part of an area which is close to the vehicle body within the forward area overlaps with the first lateral area and the second lateral area, and a part of an area which is far from the vehicle body within the forward area does not overlap with the first lateral area and the second lateral area.

5. The mining machine according to claim 1, further comprising:

a detection area setting unit that sets the forward area in front of the vehicle body and the lateral area lateral to the forward area in the detection area, wherein the width of the forward area is equal to the width of the vehicle body, the lateral area is smaller than the detection area and is at least partly set so as to protrude from the forward area in the lateral direction, the forward area includes an area that overlaps with a part of the lateral area and an area that does not overlap with the lateral area, the lateral area includes an area that overlaps with a part of the forward area and an area that does not overlap with the forward area, the obstacle detection unit determines whether or not there is the obstacle in the forward area based on the output signal of the non-contact sensor, and the distance detection unit determines whether or not there is the wall in the lateral area based on the output signal of the non-contact sensor.

6. The mining machine according to claim 5, wherein the distance to the wall detected by the distance detection unit includes a distance to one said detection point closest to the vehicle body among the plurality of detection points which indicate the presence of the object within the lateral area in a direction orthogonal to the traveling direction of the traveling device.

7. The mining machine according to claim 1, wherein the non-contact sensor is configured to contactlessly detect an object within the detection area of the non-contact sensor during the traveling device traveling, and the traveling control unit is configured to control the traveling device based on at least one of detection results separately performed by the obstacle detection unit and the distance detection unit during the traveling device traveling.

8. The mining machine according to claim 1, wherein
an edge of the detection area of the non-contact sensor extends in one side direction from a center line of the vehicle body, and
another edge of the detection area of the non-contact sensor extends in another side direction from the center line of the vehicle body.

9. The mining machine according to claim 1, wherein
when the traveling control unit determines that degree of reliability of position data acquired from GPS is low and cannot cause the traveling device to correct the position of the vehicle body based on the position data during the dead-reckoning traveling, the traveling control unit causes the traveling device to correct the position of the vehicle body and continue the dead-reckoning traveling based on the distance to the wall.

10. A management system of an unmanned mining machine including a traveling device configured to travel a traveling path in a mine and a vehicle body supported by the traveling device, the management system of the mining machine comprising:
a non-contact sensor provided in a front section of the vehicle body, configured to contactlessly detect an object within a detection area thereof including both a forward area in front of the vehicle body and a lateral area lateral to the forward area in the detection area, and arranged so that the detection area includes an area on the traveling path in front of the vehicle body and an area beside the traveling path when the traveling device travels;
an obstacle detection unit configured to detect an obstacle in the traveling path in front of the vehicle body based on an output signal of said non-contact sensor;
a distance detection unit configured to detect a distance between a wall beside the traveling path and the vehicle body based on an output signal of said non-contact sensor; and
a traveling control unit configured to control the traveling device;
wherein
the distance detection unit determines whether or not there is a detection point indicating the presence of an object based on the output signal of the non-contact sensor,
when the distance detection unit determines that there is the detection point indicating the presence of the object, the distance detection unit determines whether or not there is a plurality of detection points which indicate the presence of the object and which are continuously arranged in the traveling direction of the traveling device,
when the distance detection unit determines that there is the plurality of detection points which indicate the presence of the object and which are continuously arranged in the traveling direction of the traveling device, the distance detection unit determines that the object is the wall,
when the distance detection unit determines that the object is the wall, the distance detection unit detects the distance to the wall and outputs an instruction signal to adjust the traveling direction of the traveling device to the traveling control unit so that the vehicle body does not come into contact with the wall,
when the distance detection unit determines that there is not the plurality of detection points which indicate the presence of the object and which are continuously arranged in the traveling direction of the traveling device, the obstacle detection unit determines whether or not the object is present in front of the vehicle body based on the output signal of the non-contact sensor,
when the obstacle detection unit determines that the object is present in front of the vehicle, the obstacle detection unit recognizes that the object is the obstacle and outputs an instruction signal to the traveling control unit so that the vehicle body does not collide with the obstacle,
the traveling control unit controls the traveling device so that the distance to the wall is maintained constant based on the instruction signal from the distance detection unit, and
the traveling control unit controls the traveling device so as not to come into collision based on the instruction signal from the obstacle detection unit.

11. The management system of the mining machine according to claim 10, further comprising:
a motive power generation device configured to generate motive power, wherein
the traveling device is driven by motive power generated by the motive power generation device, and includes a brake device configured to stop traveling and a steering gear configured to adjust a traveling direction,
the obstacle detection unit causes the traveling control unit to output at least one of a power control signal for controlling the motive power generation device, a brake control signal for controlling the brake device and a steering control signal for controlling the steering gear so that the vehicle body does not collide with the obstacle based on the output signal of the non-contact sensor, and
the distance detection unit causes the traveling control unit to output a steering control signal for controlling the steering gear so that the vehicle body does not come into contact with the wall based on the output signal of the non-contact sensor.

12. The management system of the mining machine according to claim 10, further comprising:
a detection area setting unit that sets the forward area in front of the vehicle body and the lateral area lateral to the forward area in the detection area,
wherein
the width of the forward area is equal to the width of the vehicle body,
the lateral area is smaller than the detection area and is at least partly set so as to protrude from the forward area in the lateral direction,
the forward area includes an area that overlaps with a part of the lateral area and an area that does not overlap with the lateral area,
the lateral area includes an area that overlaps with a part of the forward area and an area that does not overlap with the forward area,
the obstacle detection unit determines whether or not there is the obstacle in the forward area based on the output signal of the non-contact sensor, and
the distance detection unit determines whether or not there is the wall in the lateral area based on the output signal of the non-contact sensor.

13. The management system of the mining machine according to claim 12, further comprising:

a traveling condition data generation unit that generates traveling condition data indicating a traveling condition of the traveling device, wherein the detection area setting unit curves the forward area along a target traveling route defined on the traveling path based on the traveling condition data generated by the traveling condition data generation unit when the target traveling route curves, and when the obstacle is present on the traveling path and is not present in a traveling course of the traveling device, the obstacle is not arranged in the forward area and the obstacle detection unit does not output the instruction signal to stop the traveling device.

14. An unmanned management method of a mining machine including a traveling device configured to travel a traveling path in a mine and a vehicle body supported by the traveling device, the management method of the mining machine comprising:

causing the vehicle body to travel by the traveling device with a non-contact sensor provided in a front section of the vehicle body, configured to contactlessly detect an object within a detection area thereof including both a forward area in front of the vehicle body and a lateral area lateral to the forward area in the detection area, and arranged so that the detection area includes an area on the traveling path in front of the vehicle body and an area beside the traveling path;

determining by a distance detection unit whether or not there is a detection point indicating the presence of an object based on the output signal of said non-contact sensor, when determining by the distance detection unit that there is the detection point indicating the presence of the object, determining by the distance detection unit whether or not there is a plurality of detection points which indicate the presence of the object and which are continuously arranged in the traveling direction of the traveling device, when determining by the distance detection unit that there is the plurality of detection points which indicate the presence of the object and which are continuously arranged in the traveling direction of the traveling device, determining by the distance detection unit that the object is the wall, when determining by the distance detection unit that the object is the wall, the distance detection unit detects the distance to the wall and outputs an instruction signal by the distance detection unit to adjust the traveling direction of the traveling device to the traveling control unit so that the vehicle body does not come into contact with the wall, controlling the traveling device so that the distance to the wall is maintained constant based on the instruction signal from the distance detection unit, when determining by the distance detection unit that there is not the plurality of detection points which indicate the presence of the object and which are continuously arranged in the traveling direction of the traveling device, determining by an obstacle detection unit whether or not the object is present in front of the vehicle body based on the output signal of said non-contact sensor, when determining by the obstacle detection unit that the object is present in front of the vehicle, the obstacle detection unit recognizes that the object is the obstacle and outputs an instruction signal by the obstacle detection unit to the traveling control unit so that the vehicle body does not collide with the obstacle, and controlling the traveling device so as not to come into collision based on the instruction signal from the obstacle detection unit.

\* \* \* \* \*